United States Patent
Leontaris et al.

(10) Patent No.: US 9,479,772 B2
(45) Date of Patent: *Oct. 25, 2016

(54) SYSTEMS AND METHODS FOR MULTI-LAYERED FRAME-COMPATIBLE VIDEO DELIVERY

(71) Applicant: Dolby Laboratories Licensing Corporation, San Francisco, CA (US)

(72) Inventors: Athanasios Leontaris, Mountain View, CA (US); Alexandros Tourapis, Milpitas, CA (US); Peshala V. Pahalawatta, Glendale, CA (US); Kevin Stec, Los Angeles, CA (US); Walter Husak, Simi Valley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 455 days.

This patent is subject to a terminal disclaimer.

(21) Appl. No.: 14/144,001

(22) Filed: Dec. 30, 2013

(65) Prior Publication Data
US 2014/0111614 A1 Apr. 24, 2014

Related U.S. Application Data

(63) Continuation of application No. 13/811,363, filed as application No. PCT/US2011/044757 on Jul. 20, 2011, now Pat. No. 8,619,852.

(60) Provisional application No. 61/366,512, filed on Jul. 21, 2010.

(51) Int. Cl.
H04N 7/12 (2006.01)
H04N 19/34 (2014.01)
(Continued)

(52) U.S. Cl.
CPC .... H04N 19/00442 (2013.01); H04N 13/0022 (2013.01); H04N 13/0029 (2013.01);
(Continued)

(58) Field of Classification Search
CPC ............... H04N 13/0022; H04N 13/0029; H04N 13/0048; H04N 13/00442; H04N 19/10; H04N 19/117; H04N 19/187; H04N 19/33; H04N 19/34
See application file for complete search history.

(56) References Cited

U.S. PATENT DOCUMENTS

| 4,985,767 A | 1/1991 | Haghiri |
| 6,055,012 A | 4/2000 | Haskell |

(Continued)

FOREIGN PATENT DOCUMENTS

| JP | 04-002276 | 1/1992 |
| JP | 08-102967 | 4/1996 |

(Continued)

OTHER PUBLICATIONS

Pandit, P. et al "H.264/AVC Extension for MVC Using SEI Message" Joint Video Team of ISO/IEC MPEG & ITU-T VCEG(ISO/IEC JTC1/SC29/WG11 and ITU-T SG16 Q6), 24th Meeting: Geneva, Switzerland, Jun. 29-Jul. 6, 2007, pp. 1-14.

(Continued)

Primary Examiner — Nhon Diep

(57) ABSTRACT

Multi-layered frame-compatible video delivery is described. Multi-layered encoding and decoding methods, comprising a base layer and at least one enhancement layer with reference processing, are provided. In addition, multi-layered encoding and decoding methods with inter-layer dependencies are described. Encoding and decoding methods that are capable of frame-compatible 3D video delivery are also described.

14 Claims, 20 Drawing Sheets

(51) Int. Cl.

| | | |
|---|---|---|
| *H04N 13/00* | (2006.01) | |
| *H04N 19/597* | (2014.01) | |
| *H04N 19/61* | (2014.01) | |
| *H04N 19/117* | (2014.01) | |
| *H04N 19/187* | (2014.01) | |
| *H04N 19/44* | (2014.01) | |
| *H04N 19/33* | (2014.01) | |
| *H04N 19/10* | (2014.01) | |

(52) U.S. Cl.
CPC .......... *H04N13/0048* (2013.01); *H04N 19/10* (2014.11); *H04N 19/117* (2014.11); *H04N 19/187* (2014.11); *H04N 19/33* (2014.11); *H04N 19/34* (2014.11); *H04N 19/44* (2014.11); *H04N 19/597* (2014.11); *H04N 19/61* (2014.11)

(56) References Cited

U.S. PATENT DOCUMENTS

| | | | |
|---|---|---|---|
| 6,111,596 | A | 8/2000 | Haskell |
| 6,999,513 | B2 | 2/2006 | Sohn |
| 8,098,740 | B2 | 1/2012 | Suh |
| 8,269,260 | B2 | 9/2012 | Tian |
| 8,363,724 | B2 | 1/2013 | Su |
| 8,373,744 | B2 | 2/2013 | Akka |
| 8,487,982 | B2 | 7/2013 | Lipton |
| 2003/0058931 | A1* | 3/2003 | Zhang .............. H04N 21/23432 375/240.01 |
| 2004/0179743 | A1 | 9/2004 | Shibata |
| 2007/0104276 | A1* | 5/2007 | Ha ...................... H04N 19/597 375/240.16 |
| 2007/0109409 | A1* | 5/2007 | Yea ....................... H04N 7/181 348/153 |
| 2010/0260268 | A1 | 10/2010 | Cowan |
| 2012/0026288 | A1 | 2/2012 | Tourapis |
| 2012/0092452 | A1 | 4/2012 | Tourapis |
| 2014/0313291 | A1* | 10/2014 | Fang ................ H04N 21/23432 348/43 |

FOREIGN PATENT DOCUMENTS

| | | |
|---|---|---|
| JP | 2003-319416 | 11/2003 |
| JP | 2009-522935 | 6/2009 |
| JP | 2011-528889 | 11/2011 |
| WO | 99/45713 | 9/1999 |
| WO | 2007/047736 | 4/2007 |
| WO | 2007/081752 | 7/2007 |
| WO | 2008/010932 | 1/2008 |
| WO | 2009/052206 | 4/2009 |
| WO | 2012/006299 | 1/2012 |
| WO | 2012/012444 | 1/2012 |

OTHER PUBLICATIONS

Ohm, Jens-Rainer, "Advances in Scalable Video Coding" Proc. of the IEEE, New York, USA, vol. 93, No. 1, Jan. 1, 2005, pp. 42-56.

Bandoh, Y. et al. Tutorial Lecture Overview of AVC/H.264 Scalable Extension SVC (Scalable Video Coding), the Institute of Image Information and Television Engineers (ITE) Technical Report, vol. 34, No. 6, Feb. 15, 2010, pp. 141-145.

Hutchison, David, "Introducing DLP 3-D TV".

ITU-T Recommendatiion H.264 "Advanced Video Coding for Generic Audiovisual Services", Mar. 2010.

SMPTE 421 M, "VC-1 Compressed Video Bistream Format and Decoding Process" Apr. 2006.

DVB Organization: "DVB-TM-3DTV, Phase 1 Dolby Labs1.0" Digital Video Broadcasting , May 2010, p. 8-9.

Tourapis A. M. et al. "Format Extension to the Spatially Interleaved Pictures SEI Message" JVT Meeting Jan. 31, 2009.

Tourapis, A.M. et al. "A Frame Compatible System for 3D Delivery" MPEG Meeting Jul. 2010.

Tourapis, A. et al. "System Specification and Software of a Frame Compatible Full Resolution 3D Video Coding System" MPEG Meeting Jul. 2010.

Husak, Walt "Stereoscopic Delivery of 3D Content to the Home" 2010 Spring Technical Forum, May 11, 2010, pp. 10-19.

Lei, Y. et al "An Improved Multiview Stereo Video FGS Scalable Scheme" 3DTV Conference: The True Vision—Capture, Transmission and Display of 3D Video, IEEE, Piscataway, NJ, USA, May 4, 2009, pp. 1-4.

Tourapis, A. et al "3D-TV Content Storage and Transmission" IEEE Transactions on Broadcasting, vol. 57, Issue 2, Jun. 2011, pp. 384-394.

* cited by examiner

SYSTEMS AND METHODS FOR MULTI-LAYERED FRAME-COMPATIBLE VIDEO DELIVERY

CROSS-REFERENCE TO RELATED APPLICATIONS

The present application is a continuation of, and claims benefit of priority to, U.S. patent application Ser. No. 13/811,363 filed Jan. 21, 2013, which claims priority to International Application PCT/US2011/044757 filed Jul. 20, 2011, which claims priority to U.S. Provisional Patent Application No. 61/366,512 filed Jul. 21, 2010, all hereby incorporated by reference.

TECHNOLOGY

The present disclosure relates to image processing and video compression. More particularly, an embodiment of the present invention relates to encoding and decoding systems and methods for multi-layered frame-compatible video delivery.

BACKGROUND

Recently, there has been considerable interest and traction in the industry towards stereoscopic (3D) video delivery. High grossing movies have brought 3D stereoscopic video into the mainstream, while major sports events are also being produced and broadcast in 3D. Animated movies, in particular, are increasingly being generated and rendered in stereoscopic format.

While though there is already a sufficiently large installed base of 3D-capable cinema screens, the same is not true for consumer 3D applications. Efforts in this space are still in their infancy, but several industry parties are investing considerable effort into the development and marketing of consumer 3D-capable displays [Reference 1].

Stereoscopic display technology and stereoscopic content creation are issues that have to be properly addressed to ensure sufficiently high quality of experience. The delivery of 3D content is equally critical. Content delivery comprises several components, including compression. Stereoscopic delivery is challenging because a stereoscopic delivery system handles twice as much information as a 2D delivery system does. Furthermore, the computational and memory throughput requirements increase considerably as well.

In general, there are two main distribution channels through which stereoscopic content can be delivered to the consumer: fixed media, such as Blu-Ray discs, and streaming solutions where the content is delivered primarily to a set-top box and secondarily to a PC.

The majority of the currently deployed Blu-Ray players and set-top boxes support only codecs such as those based on the profiles of Annex A of the ITU-T/ISO/IEC H.264/14496-10 [Reference 2] state-of-the-art video coding standard (also known as MPEG-4 Part 10 AVC) and the SMPTE VC-1 standard [Reference 3].

Each of these codec solutions enables a service provider to deliver a single HD image sequence at 1920×1080-pixel resolution. However, to deliver stereoscopic content involves transmitting information for two sequences, a left and a right one. A straightforward approach is to encode two separate bitstreams, one for each view, an approach also known as simulcast.

First, simulcast or similar approaches have low compression efficiency. They also use high bandwidth to maintain an acceptable level of quality. This is because the left and right view sequences are coded independently even though they are correlated.

Second, the two separate bitstreams are de-multiplexed and decoded in parallel in two properly synchronized decoders. To implement such decoders, one may use two existing off-the-shelf decoders. In addition, parallel decoding fits Graphics Processing Unit architectures.

Codecs that support multiple layers may provide high compression efficiency for stereoscopic video while at the same time maintaining backwards compatibility.

Multi-layer or scalable bitstreams are composed of multiple layers that are characterized by pre-defined dependency relationships. One or more of those layers are so-called base layers that are decoded before any other layer and are independently decodable.

Other layers are usually known as enhancement layers since their function is to improve the content obtained by parsing and decoding the base layer or layers. These enhancement layers are also dependent layers in that they depend on the base layers. The enhancement layers use some kind of inter-layer prediction, and often one or more of the enhancement layers may also be dependent on the decoding of other higher priority enhancement layers. Thus, decoding may also be terminated at one of the intermediate layers.

Multi-layer or scalable bitstreams enable scalability in terms of quality/signal-to-noise ratio (SNR), spatial resolution, and/or temporal resolution, and/or even availability of additional views. For example, using codecs based on Annex A profiles of H.264/MPEG-4 Part 10, VC-1, or VP8, one may produce bitstreams that are temporally scalable.

A first base layer, if decoded, may provide a version of the image sequence at 15 frames per second (fps), while a second enhancement layer, if decoded, can provide, in conjunction with the already decoded base layer, the same image sequence at 30 fps.

SNR and spatial scalability are also possible. For example, when adopting Scalable Video Coding (SVC) extension of the H.264/MPEG-4 Part 10 AVC video coding standard (Annex G), the base layer (coded under Annex A) generates a coarse quality version of the image sequence. The enhancement layer or layers may provide additional increments in terms of visual quality. Similarly, the base layer may provide a low resolution version of the image sequence. The resolution may be improved by decoding additional enhancement layers, spatial or/and temporal. Scalable or multi-layered bitstreams are also useful for providing multi-view scalability.

The Stereo High Profile of the Multi View Coding (MVC) extension (Annex H) of H.264/AVC was recently finalized and has been adopted as the video codec for the next generation of Blu-Ray discs (Blu-Ray 3D) that feature stereoscopic content. This coding approach attempts to address, to some extent, the high bit rate requirements of a stereoscopic video stream.

The Stereo High Profile utilizes a base layer that is compliant with the High Profile of Annex A of H.264/AVC and which compresses one of the views (usually the left) that is termed the base view. An enhancement layer then compresses the other view, which is termed the dependent view. While the base layer is on its own a valid H.264/AVC bitstream, and is independently decodable from the enhancement layer, the same may not be, and usually it is not, true for the enhancement layer. This is because the enhancement layer can utilize as motion-compensated prediction references decoded pictures from the base layer. As a result, the dependent view (enhancement layer) may benefit from inter-view prediction and compression may improve considerably for scenes with high inter-view correlation (i.e. low stereo disparity). Hence, the MVC extension approach attempts to tackle the problem of increased bandwidth by exploiting stereoscopic disparity.

However, such an approach might not provide compatibility with the existing deployed set-top box and Blu-Ray player infrastructure. Even though an existing H.264 decoder may be able to decode and display the base view, it will simply discard and ignore the dependent (right) view. As a result, existing decoders do not provide the capability to decode and display 3D content encoded using MVC. Hence, while MVC retains 2D compatibility, MVC does not deliver 3D content in legacy devices. The lack of backwards compatibility is an additional barrier towards rapid adoption of consumer 3D stereoscopic video.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

DESCRIPTION OF EXAMPLE EMBODIMENTS

Figure 1:
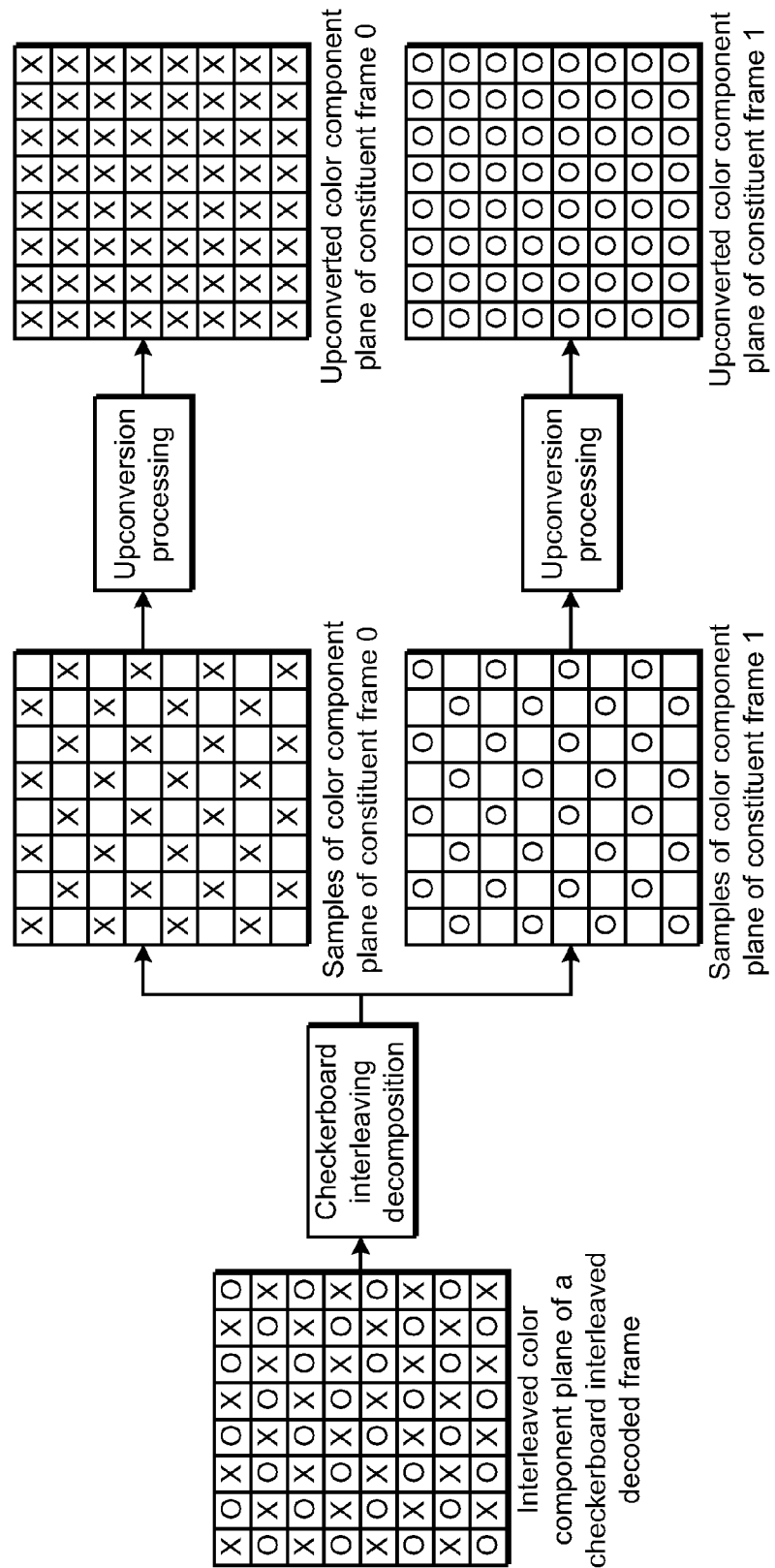
FIG. 1 depicts a checkerboard interleaved arrangement for the delivery of stereoscopic material.
Figure 2:
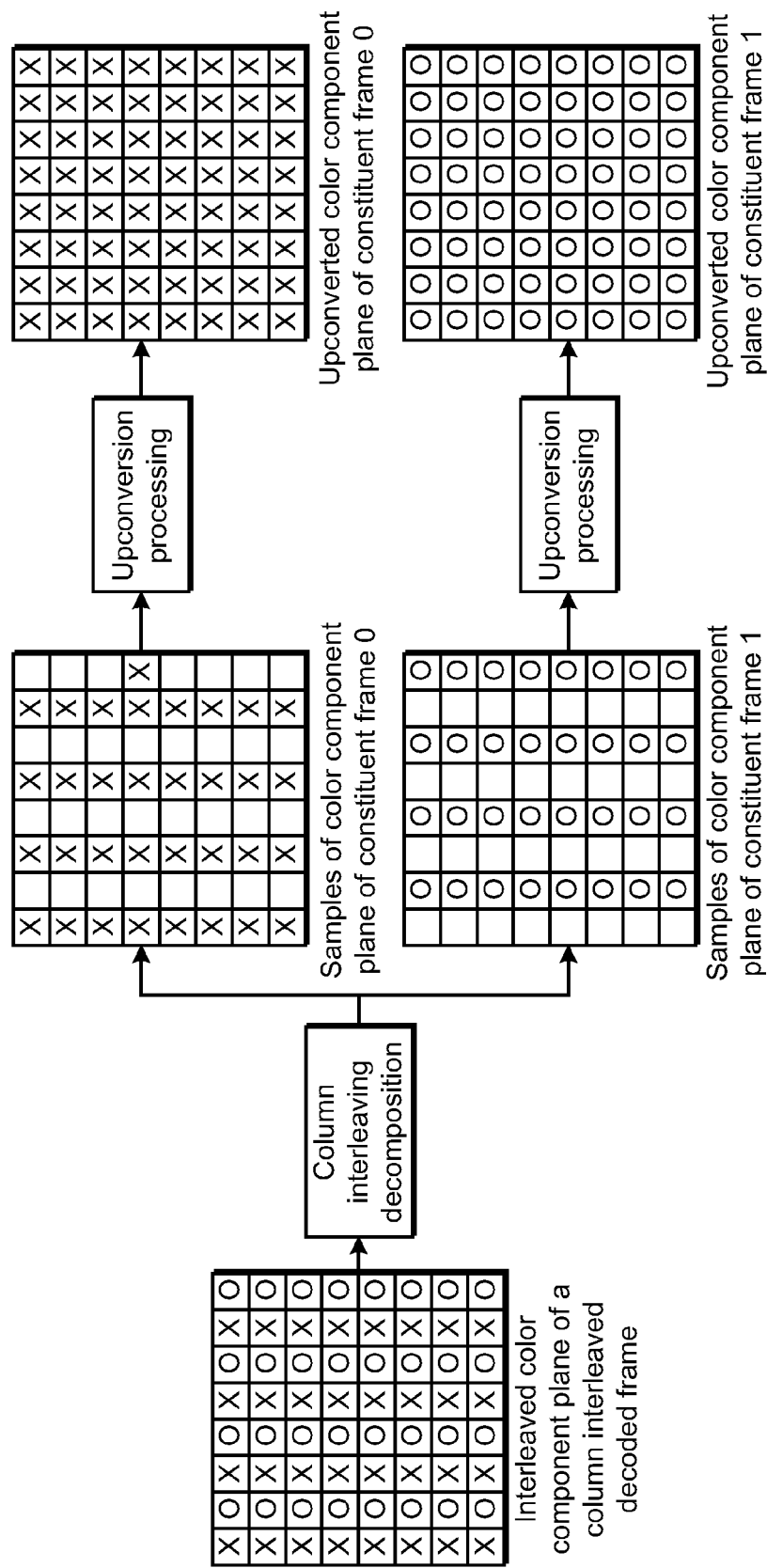
FIG. 2 depicts a horizontal sampling/column interleaved arrangement for the delivery of stereoscopic material
Figure 3:
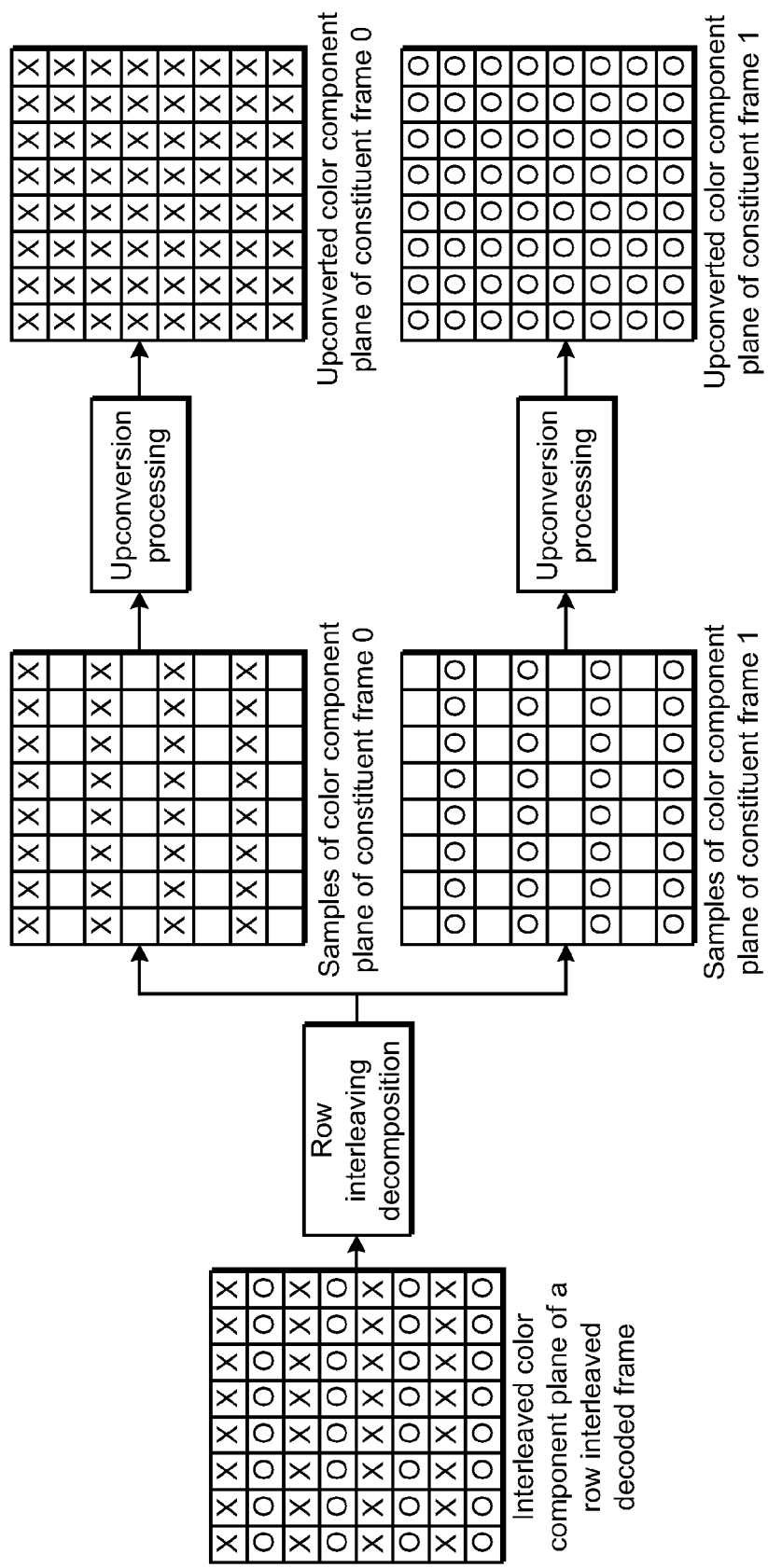
FIG. 3 depicts a vertical sampling/row interleaved arrangement for the delivery of stereoscopic material.
Figure 4:
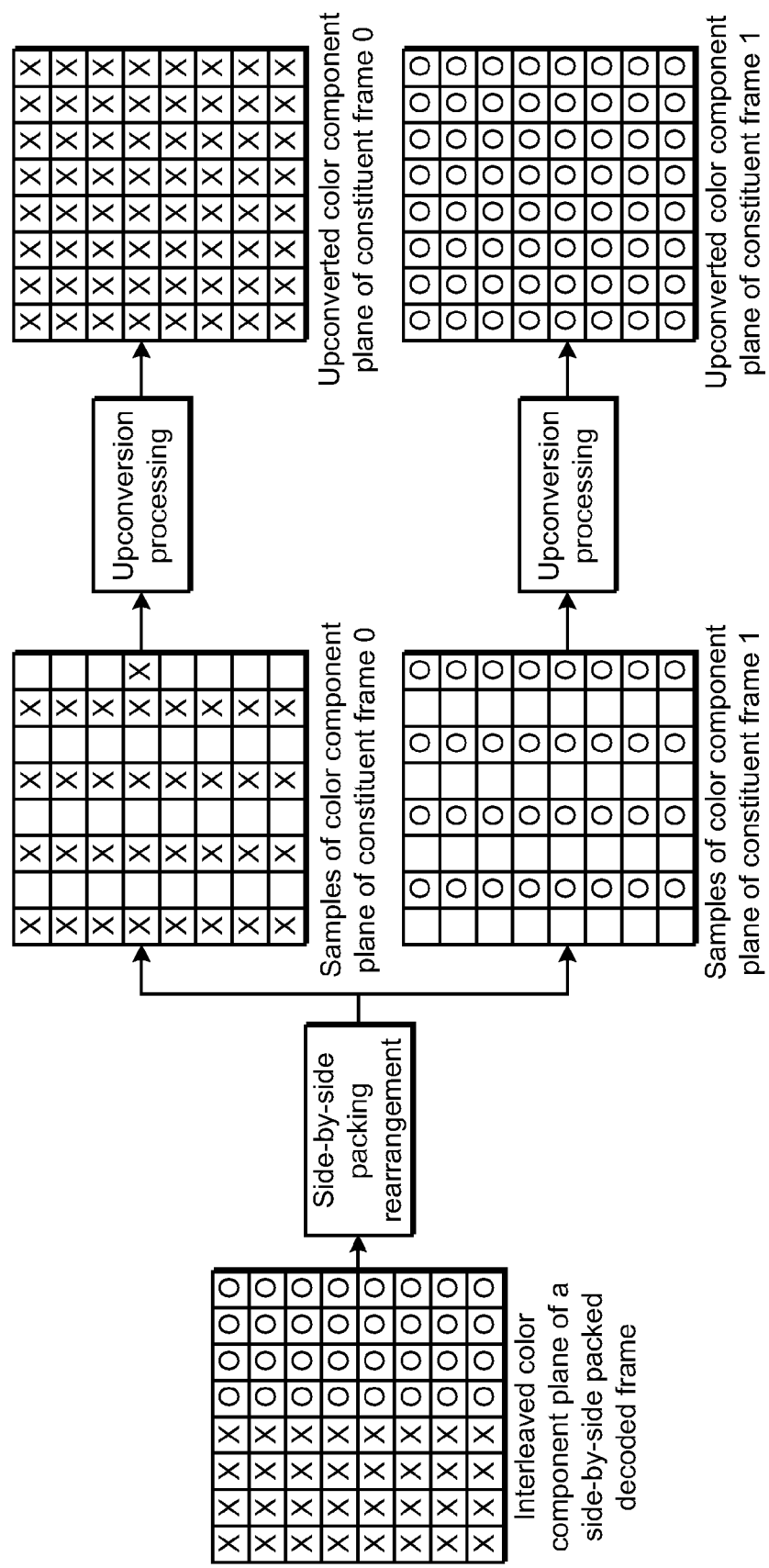
FIG. 4 depicts a horizontal sampling/side by side arrangement for the delivery of stereoscopic material.
Figure 5:
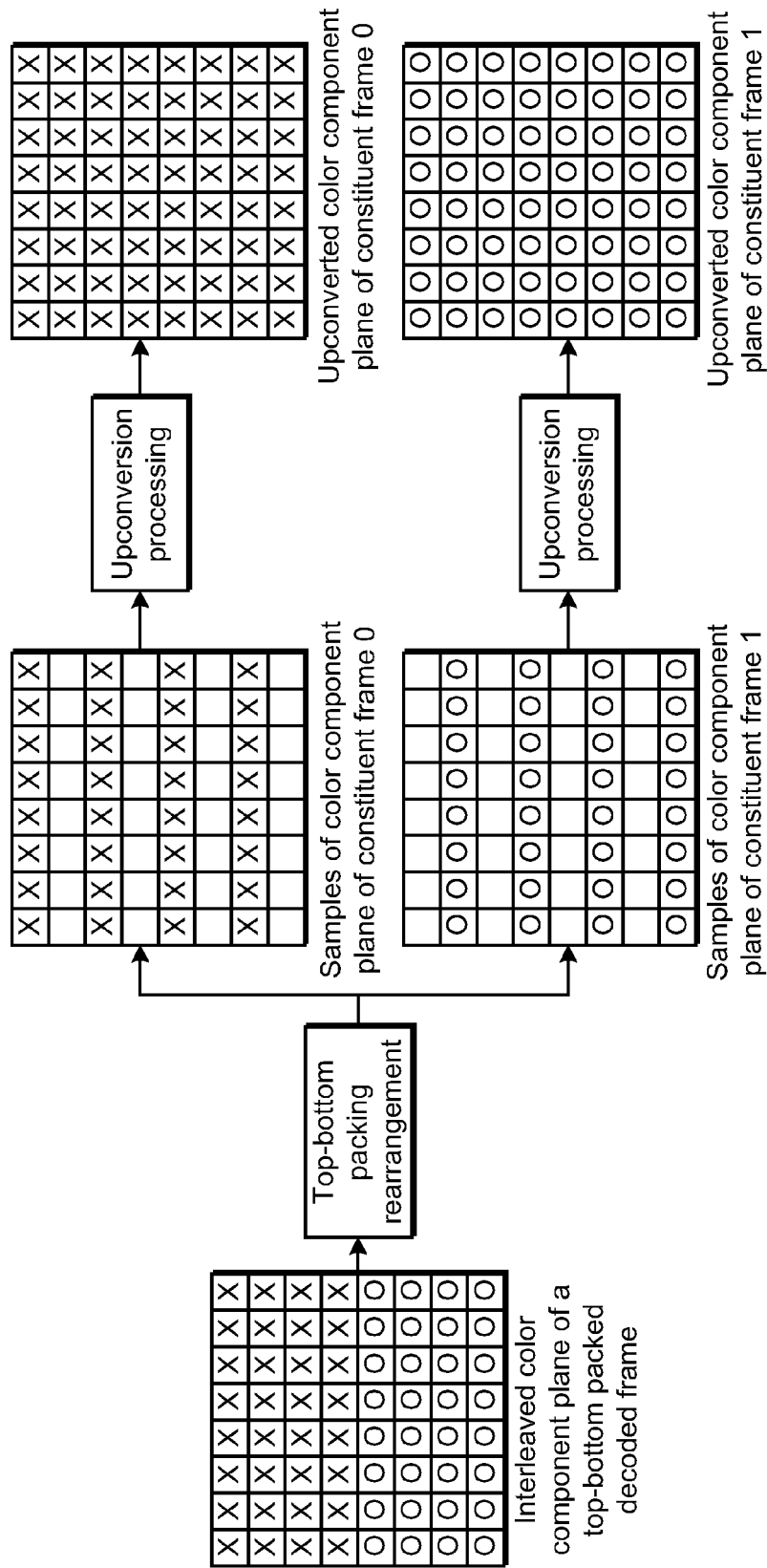
FIG. 5 depicts a vertical sampling/over-under arrangement for the delivery of stereoscopic material.
Figure 6:
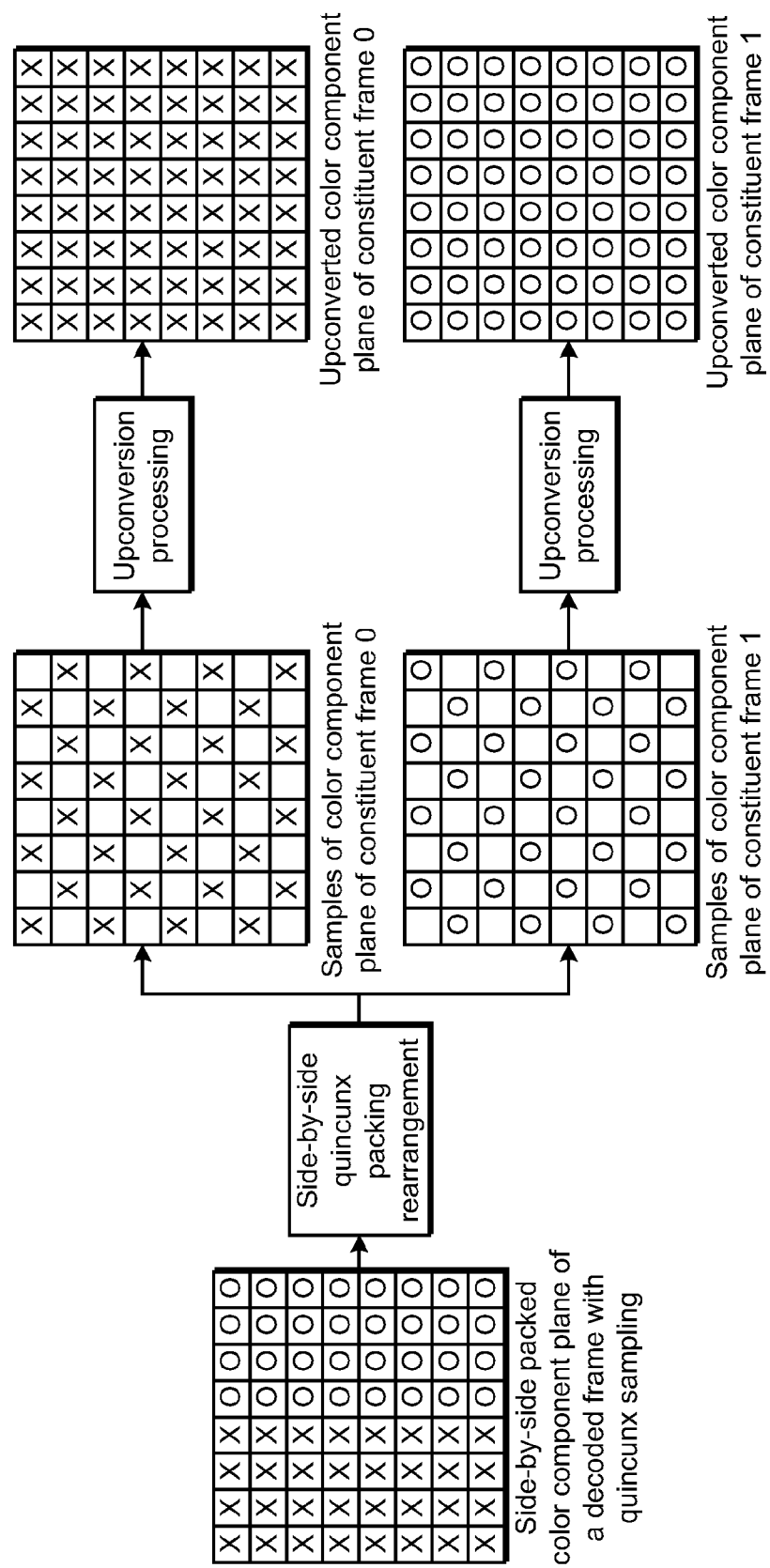
FIG. 6 depicts a quincunx sampling/side by side arrangement for the delivery of stereoscopic material.

According to a first aspect of the present disclosure, an encoding method for multi-layered frame-compatible video delivery is provided, said encoding method comprising: a) base layer processing images or video frames of multiple data categories through a base layer, comprising: i) providing a base layer frame-compatible representation of the images or video frames of the multiple data categories; and b) enhancement layer processing the images or video frames of multiple data categories through one or more enhancement layers, comprising: i) providing a enhancement layer frame-compatible representation of the images or video frames of the multiple data categories; ii) maintaining at least one enhancement layer reference picture buffer; iii) reference processing at least one dependency on the base layer or a different enhancement layer; and iv) performing motion or disparity compensation, wherein each of said one or more enhancement layer processes all the multiple data categories.

According to a second aspect of the present disclosure, an encoding method for multi-layered frame-compatible video delivery is provided, said encoding method comprising: a) base layer processing images or video frames of multiple data categories through a base layer, comprising: i) providing a base layer frame-compatible representation of the images or video frames of the multiple data categories; an b) enhancement layer processing the images or video frames of multiple data categories through one or more enhancement layers, wherein each of the multiple data categories is processed separately in a separate enhancement layer, each of the one or more enhancement layers comprising: i) providing an enhancement layer representation of images or videos for one of the multiple data categories; ii) maintaining a enhancement layer reference picture buffer in each enhancement layer; iii) reference processing at least one dependency on the base layer or a different enhancement layer; and iv) performing motion or disparity compensation.

According to a third aspect of the present disclosure, a decoding method for multi-layered frame-compatible video delivery is provided, said decoding method comprising: a) base layer processing a plurality of base layer bitstream signals through a base layer, comprising: i) providing at least one frame-compatible base layer decode image or video frame; and b) enhancement layer processing a plurality of enhancement bitstream signals through one or more enhancement layers, comprising: i) providing at least one enhancement layer-decoded image or video frame for multiple data categories; ii) maintaining at least one enhancement layer reference picture buffer; iii) reference processing at least one dependency on the base layer or a different enhancement layer; and iv) performing disparity compensation, wherein all the multiple data categories are decoded and processed in the same enhancement layer.

According to a fourth aspect of the present disclosure, a decoding method for multi-layered frame-compatible video delivery is provided, said decoding method comprising: a) base layer processing a plurality of base layer bitstream signals through a base layer through a base layer, comprising: i) providing at least one frame-compatible base layer decode image or video frame; and b) enhancement layer processing a plurality of enhancement bitstream signals through one or more enhancement layers for multiple data categories through one or more enhancement layers, wherein each of the multiple data categories is processed separately in a separate enhancement layer, each of the one or more enhancement layers comprising: i) providing at least one enhancement layer-decoded image or video frame for one of the multiple data categories; ii) maintaining at least one enhancement layer reference picture buffer; iii) reference processing at least one dependency on the base layer or a different enhancement layer; and iv) performing disparity compensation, wherein all the multiple data categories are decoded and processed in the same enhancement layer.

In light of the existing codecs' lack of backwards compatibility, exploiting the installed base of set-top boxes, Blu-Ray players, and high definition TV sets may speed up the consumer 3D deployment. Most display manufacturers are offering high definition TV sets that support 3D stereoscopic display. These TV sets include models of all majors display technologies: LCD, plasma, and DLP [Reference 1]. The key is to provide the display with content that contains both views but still fits within the confines of a single frame, while still utilizing existing and deployed codecs such as VC-1 and H.264/AVC. Such an approach is the so-called frame-compatible approach, which formats the stereo content so that it fits within a single picture or frame. The size of the frame-compatible representation needs not be the same with that of the original view frames.

Similarly to the MVC extension of H.264, Dolby's stereoscopic 3D consumer delivery system [Reference 4] features a base and an enhancement layer. In contrast to the MVC approach, the views may be multiplexed into both layers in order to provide consumers with a base layer that is frame compatible by carrying sub-sampled versions of both views and an enhancement layer that when combined with the base layer results to full resolution reconstruction of both views.

Figure 7:
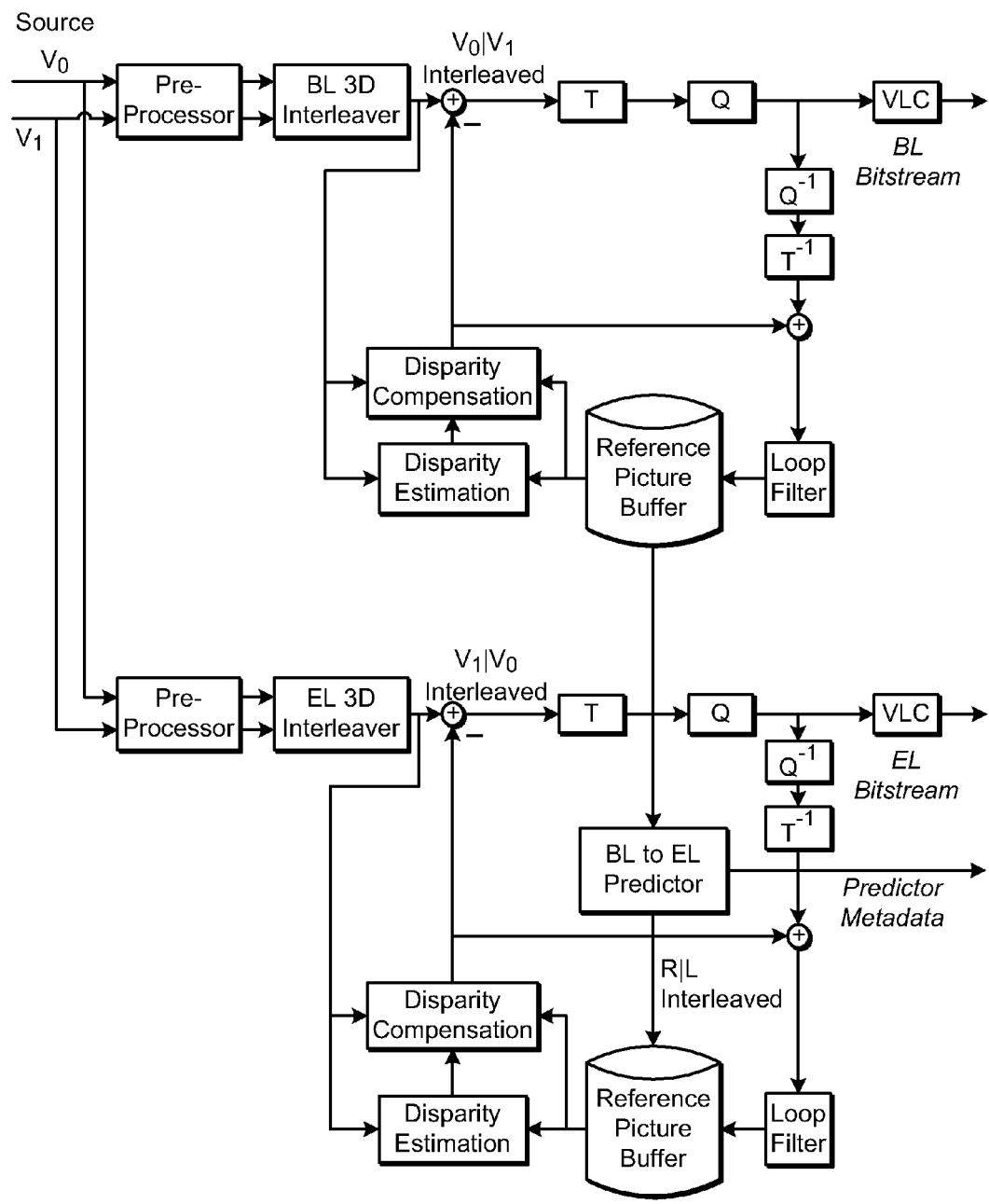
FIG. 7 depicts a frame-compatible full-resolution 3D stereoscopic scalable video encoding system with reference processing for inter-layer prediction.
Figure 8:
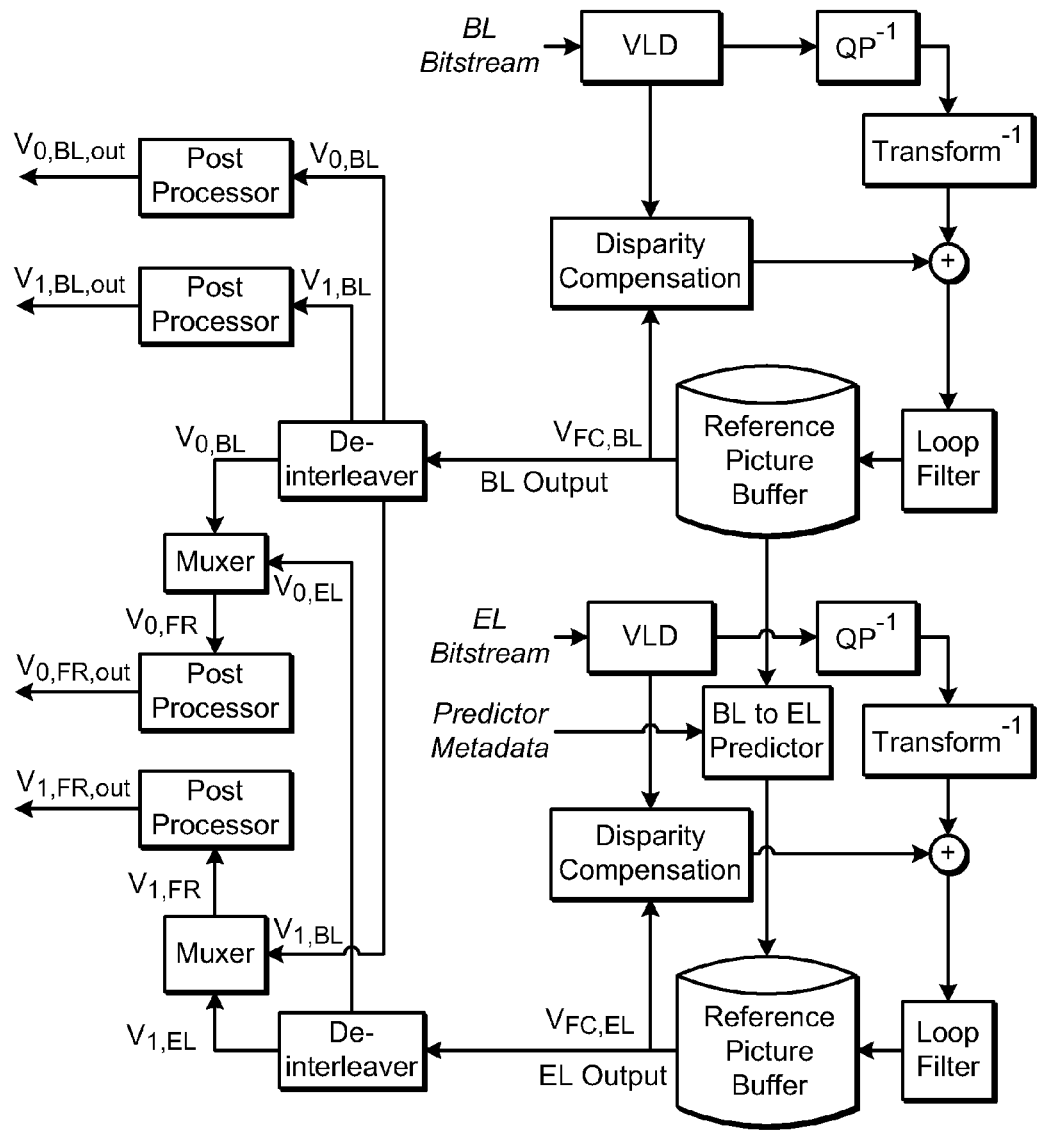
FIG. 8 depicts a frame-compatible full-resolution 3D stereoscopic scalable video decoding system with reference processing for inter-layer prediction.

A backward-compatible 3D video delivery system may deliver 3D video to homes or other venues through existing or legacy 2D video hardware and systems. Frame compatible 3D video systems provide such a backwards compatible delivery architecture. In that case, a layered approach can be used in which the base layer provides a low resolution version of the left and right eye arranged in a "frame-compatible" format. Frame-compatible formats include side-by-side, over-under, and quincunx/checkerboard interleaved. FIGS. 1-6 show some indicative examples. Furthermore, an additional pre-processing stage may be present that predicts the enhancement layer frame given the base layer decoded frame prior to using it as a motion-compensated reference for prediction of the enhancement layer. FIGS. 7 and 8 show an encoder and a decoder for the system disclosed in [Reference 4], respectively.

Figure 9:
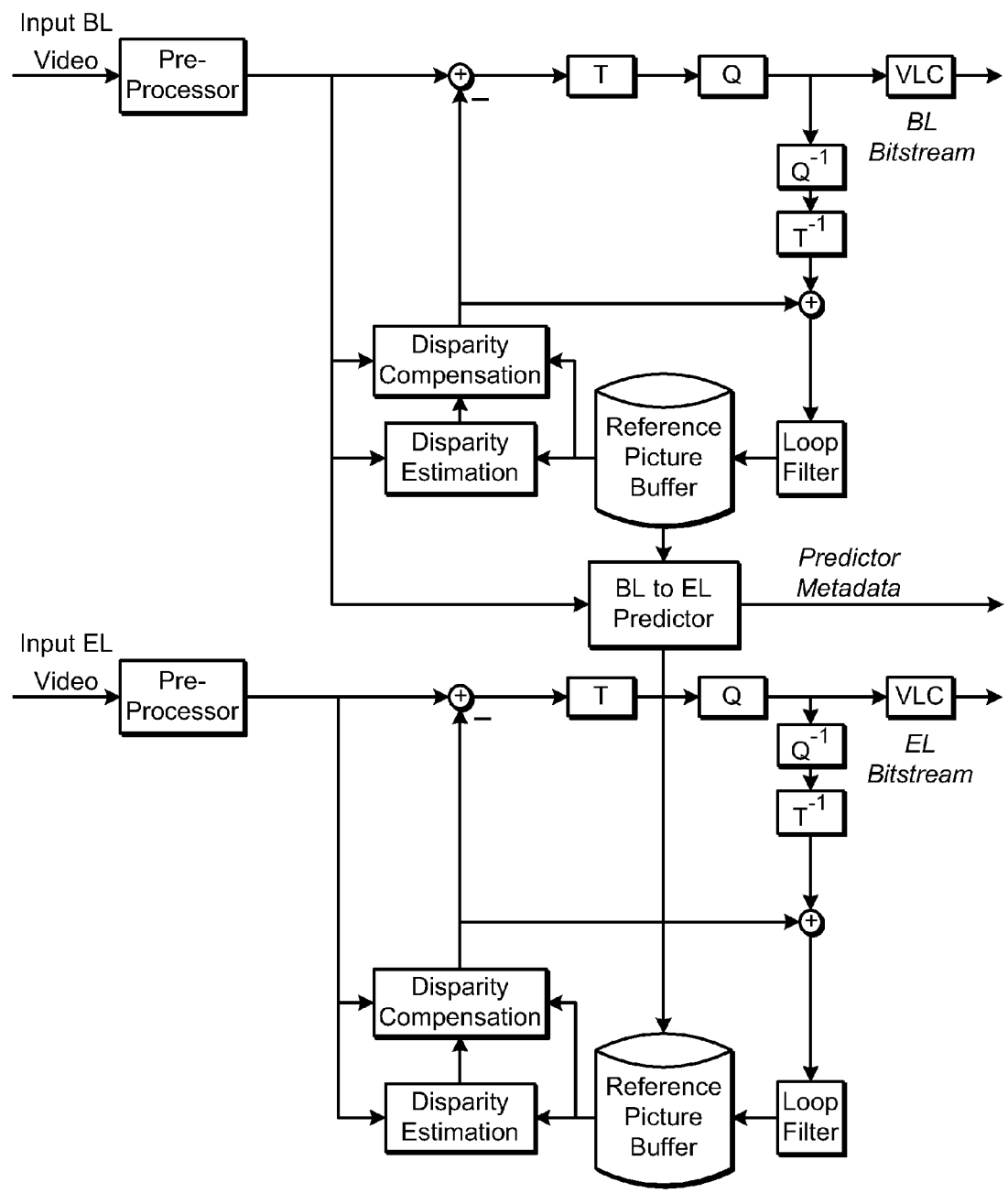
FIG. 9 depicts a scalable video coding system with a reference processing unit for inter-layer prediction.

Even a non-frame-compatible coding arrangement such as that of MVC can also be enhanced with a pre-processor (for example, a reference processing unit (RPU)/predictor) that improves the reference taken from the base view before using it as a reference for prediction of the dependent view. This architecture is also disclosed in [Reference 4] and is illustrated in FIG. 9.

Figure 10:
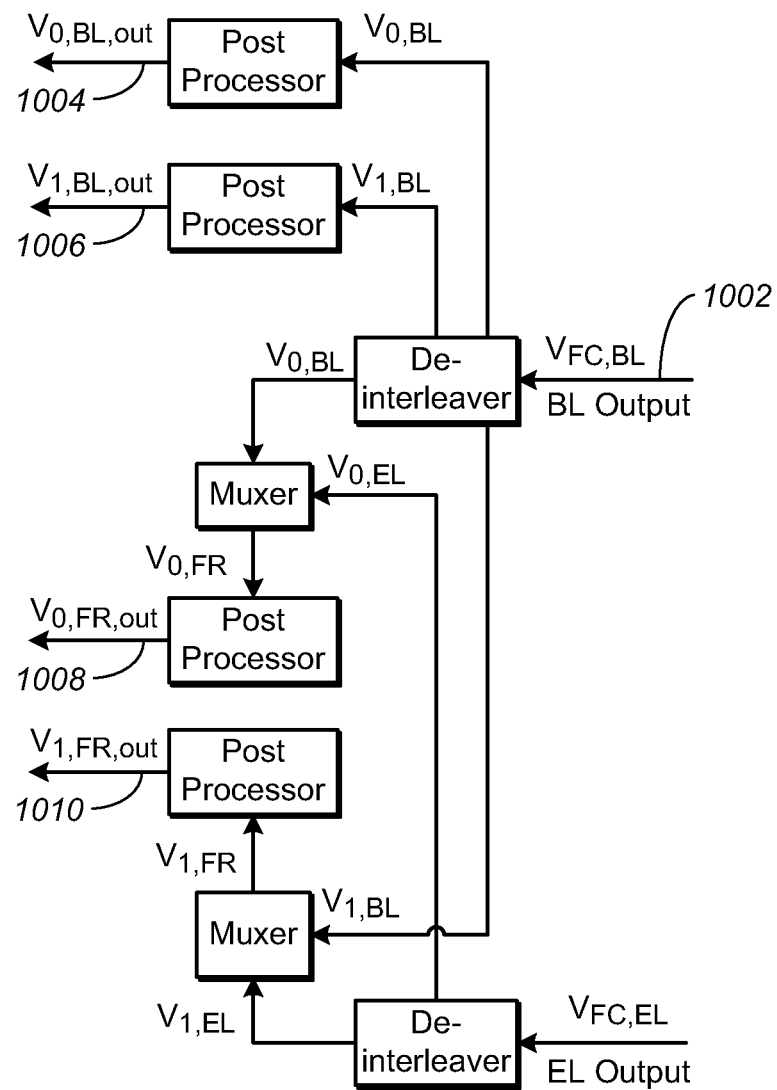
FIG. 10 depicts a reconstruction module for a frame-compatible full-resolution two-layer delivery system.

The frame-compatible techniques of [Reference 4] ensure a frame-compatible base layer. Through the use of the pre-processor/RPU element, these techniques reduce the overhead in realizing full-resolution reconstruction of the stereoscopic views. FIG. 10 shows the process of full-resolution reconstruction.

Based on the availability of the enhancement layer, there are several methods to obtain the final reconstructed views. Some of the methods can consider encoding of actual pixel data in the enhancement layer, or may consider coding residual data or in general different from the base layer (e.g. high frequencies vs. low frequencies) data that, if combined in a certain form, can enable a higher quality/resolution representation of the reconstructed signal. Any resolution could be used for these methods, e.g. some of these methods can be at half resolution, while some of them can be at full resolution or even lower, higher, or somewhere in between. Embodiments of the present disclosure may be directed at any resolution. They can be interpolated from the frame compatible output of the base layer ($V_{FC,BL}$ (1002) of FIG. 10) and optionally post-processed to yield $V_{0,BL,out}$ (1004) and $V_{1,BL,out}$ (1006). Alternatively, they can be multiplexed with the proper samples of the enhancement layer to yield a higher representation reconstruction $V_{0,FR,out}$ (1008) and $V_{1,FR,out}$ (1010) of each view. The resulting reconstructed views in both cases may have the same resolution. However, in the second case one encodes information for all samples, while, in the first case, half of the information of the reconstructed views is obtained by interpolation with intelligent algorithms, as disclosed in [Reference 4]. From FIG. 10 one may observe that, following the decoding of the base and enhancement layers, additional and potentially memory-intensive and bandwidth-intensive operations are used in order to derive the final full-resolution reconstructed views.

The present disclosure provides techniques that enable frame compatible 3D video systems to achieve full resolution 3D delivery. The present disclosure also provides methods to improve the internal prediction accuracy in the enhancement layers by performing motion and stereo disparity compensation in some higher representation/resolution sample domains. Such domains may have higher spatial or frequency resolution than the samples in the frame-compatible representation. In some embodiments, these domains may have resolution equal to the full-resolution, that is, the original resolution of the frames for each category before those frames are filtered, sampled, and multiplexed into the frame-compatible representation. Additional methods for processing of data that are compressed by these arrangements can be found in [Reference 5]. Throughout the specification, the term "data category," or "category," refers to a group of data. Different data categories may refer to different groups of data that may or may not have inter-group relation. For embodiments of the present disclosure related to 3D or stereoscopic image or video delivery, the term "data category," or "category," refers to a single view for 3D images or videos.

Figure 11:
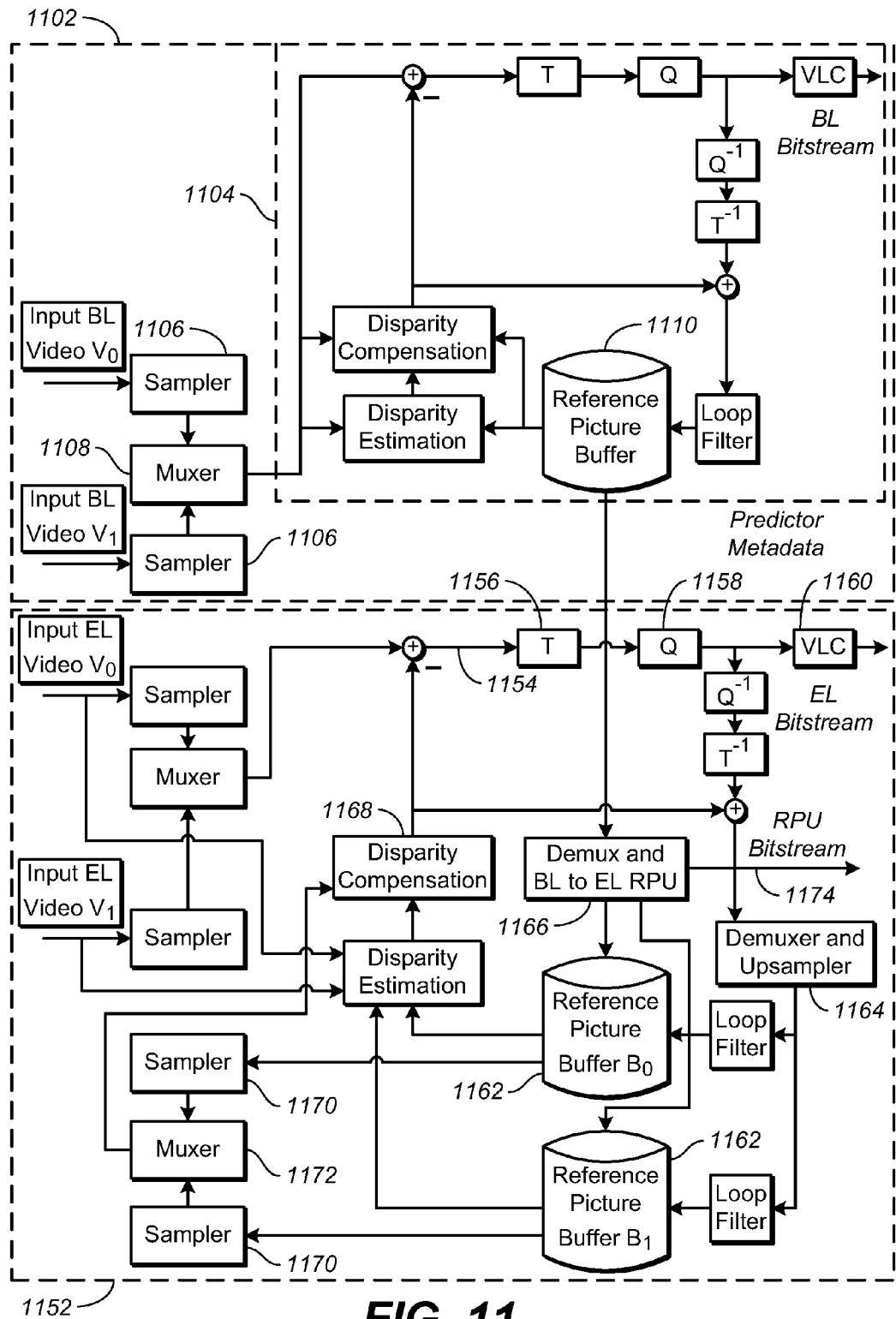
FIG. 11 depicts a multi-layer resolution-scalable 3D stereo video encoder, where the enhancement layer maintains two reference picture buffers, each one at enhancement resolution and performs motion/disparity compensation in some reduced resolution (frame-compatible), in accordance with an embodiment of the present disclosure.
Figure 12:
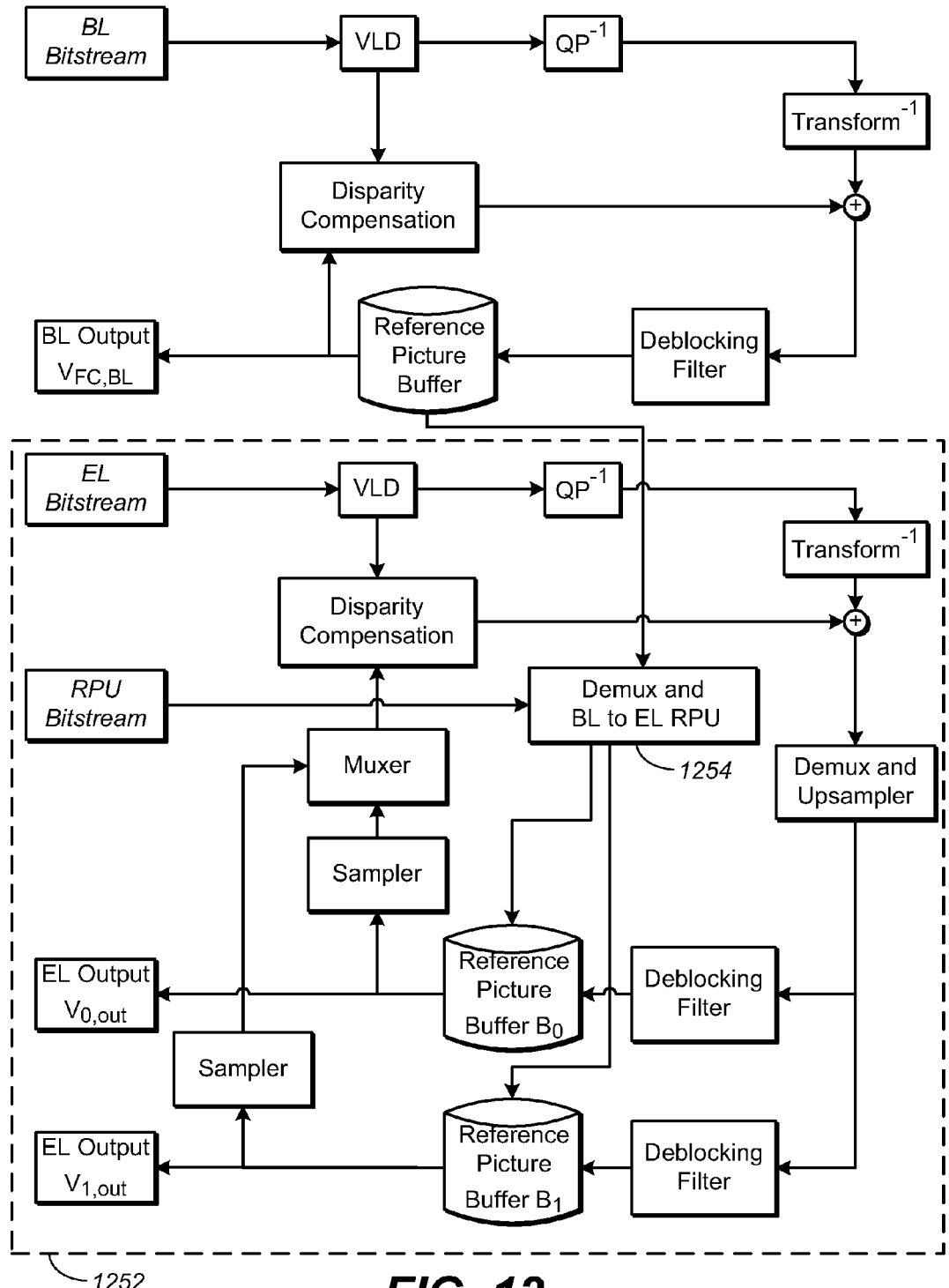
FIG. 12 depicts a multi-layer resolution-scalable 3D stereo video decoder, where the enhancement layer maintains two reference picture buffers, each one at enhancement resolution and performs motion/disparity compensation in some reduced resolution (frame-compatible), in accordance with an embodiment of the present disclosure.

FIG. 11 shows a multi-layer resolution-scalable 3D stereo video encoder where the enhancement layer maintains two reference picture buffers, each one at enhancement resolution and performs motion/disparity compensation in some reduced resolution (e.g. half horizontal or vertical resolution), in accordance with an embodiment of the present disclosure. FIG. 12 shows a decoder corresponding to the encoder shown in FIG. 11, in accordance with the embodiment of the present disclosure. According to this embodiment, a multiple-layer codec is provided for compression of a video sequence that consists of frames belonging to multiple data categories for a given time instance.

According to this embodiment of the present disclosure, the base layer (1102) of FIG. 11 provides a frame-compatible representation of multiple data categories. Frame-compatible representation here refers to sampling and multiplexing the different data categories into a single frame. This single frame may not have the same size as that of the frames comprising the original categories. According to a further embodiment of the present disclosure, the base layer (1102) of FIG. 11 may be implemented and encoded using any available or future video codecs, such as H.264/AVC, VP8, and VC-1.

With continued reference to FIG. 11, before sending the data to the base layer encoder (1104), the data is sampled with samplers (1106) and multiplexed with a multiplexer (1108). In a further embodiment, sampling may also comprise filtering. Furthermore, filtering can be asymmetric among the different data categories. For example, in still further embodiments, one category may be filtered and sampled such that less than half of the information (e.g. frequency content) is retained. And another category may be filtered and sampled such that more than half of the information is retained. FIGS. 1-6 show indicative sampling and multiplexing arrangements for two categories of image data.

According to the embodiment shown in FIG. 11, an additional enhancement layer (1152) is provided. According to other embodiments, the number of the additional enhancement layers depends on the number of categories of the frame data and the data already sampled and interleaved within the base layer. The data that is sampled and interleaved in an enhancement layer is selected such that, when combined with the data already in the base layer, the sampled and interleaved data leads to an efficient representation and reconstruction of data of most categories. According to the embodiment shown in FIG. 11, which involves two categories of data, one enhancement layer (1152) is used to code all the original data. According to this embodiment, the base layer (1102) could carry half the samples of each category and the enhancement layer (1152) could provide the other missing half samples of each data category.

According to a further embodiment of the present disclosure, the base layer compresses one third of the samples of one category and the rest two thirds are stored in the enhancement layer. The opposite is also possible. Similarly, as with the base layer, the data content of each category in an enhancement layer may not be the same as that of another data category. This may be realized by using different type of filtering or different number and arrangement of samples (e.g. quincunx vs. row-based sub-sampling). According to this embodiment, the sampling operation derives samples for the enhancement layer processing, and the sampling operation may include filtering of these samples.

According to the embodiment shown in FIG. 11, the enhancement layer (1152) adopts a hybrid video coding model that can be found in modern video codecs, such as VC-1 and H.264/AVC. The input data are predicted either from neighboring samples in the same picture or frame (using intra prediction) or from samples from past decoded frames (inter prediction) that belong to the same layer and are buffered as motion-compensated prediction references within a so-called reference picture buffer. Inter-layer prediction is also possible if decoded information from lower priority layers (such as the base layer) is available to the enhancement layer. One way to have access to such information is by considering decoded pictures from the lower priority layer as references for motion compensation. After prediction, the prediction residuals (1154) undergo transform (1156) and quantization (1158) and the quantized coefficients are then coded using entropy coding (1160). The enhancement layer (1252) of the decoder shown in FIG. 12 reverses this process.

Unlike the base layer (1102) of FIG. 11, which has a single reference picture buffer (1110) that contains past decoded pictures/frames, the enhancement layers (1152) maintain multiple internal reference picture buffers (1162), one for each data category. In the embodiment of FIG. 11, the generation of the reference pictures that are stored in those buffers is accomplished through the use of a de-multiplexer and RPU processor (1164). The de-multiplexer and RPU processor (1164) process the sum of the prediction residual and the predicted frame (obtained through intra or inter prediction).

The de-multiplexer (1164) of FIG. 11 performs also up-sampling and interpolation of missing samples for each category. Each reference picture buffer (1162) contains only frames belonging to the same data category. The buffers (1162) store images or frames at a higher resolution than the resolution of the samples being input to the enhancement layer (1102), or optionally at the enhancement-resolution. In addition, the resolutions used to store frames in each reference picture buffer may differ from each other. One buffer may store pictures at one resolution, while a second picture buffer may store pictures at another resolution. Prior to performing disparity compensation (i.e. motion compensation or intra prediction) (1168), the selected references from each reference picture buffer (1162) are down-sampled with samplers (1170) and multiplexed with a multiplexer (1172) to generate a single reference picture that may now be formatted in a frame-compatible arrangement. According to a further embodiment, the down-sampling and multiplexing operation into the frame-compatible format may include more sophisticated operations such as linear or non-linear combinations of the two references into the final frame-compatible reference picture. According to a still further embodiment, the resolution of the frames in the internal buffers may match the enhancement resolution.

According to the embodiment shown in FIG. 11, inter prediction within the enhancement layer (1152) takes place after sampling (1170) and multiplexing (1172) the reference pictures provided from the internal multiple (optionally, enhancement resolution) reference picture buffers. Inter prediction thus takes place in a "frame-compatible" domain, though not necessarily in the same domain as that of the base layer. According to a further embodiment for stereoscopic video, the base layer frame compatible format may comprise the even columns from the left view and the odd columns from the right view, while at the enhancement layer the frame compatible format may comprise the odd columns from the left view and the even columns from the right view. Similar arrangements are also possible for other interleaving arrangements such as over-under, side-by-side, etc. Proper arrangement methods are so selected that the combination of the samples coded in the frame-compatible base layer picture and the samples coded in the enhancement layer or enhancement layers should yield enhancement-resolution reconstructions of the data categories. Such a technique may be extended to any number of layer or views, in accordance with another embodiment of the present disclosure. In addition, the inter prediction process comprises estimating a set of motion parameters for each enhancement layer, which are coded and transmitted to the decoder.

According to the embodiment shown in FIG. 11, the enhancement layer reference picture buffers (1162) contain pictures that are not limited to de-multiplexed and up-sampled (1164) decoded pictures of the enhancement layer (1152). A base-layer-to-enhancement-layer reference processing unit (RPU)/pre-processor module (BL-to-EL RPU) (1166) takes as input frame-compatible decoded pictures from the reference picture buffer (1110) of the base layer (1102), and then de-multiplexes and up-samples the frame data to estimate the higher representation (optionally enhancement-resolution) frames belonging to different data categories.

According to a further embodiment, the BL-to-EL RPU (1166) process may comprise filtering, upscaling, interpolation of missing samples, and recovery or estimation of frequency content. Recovery or estimation of frequency content is used when, for example, the base layer codes low frequencies and the enhancement layer codes high frequencies. These BL-to-EL RPU (1166) processed images are then placed and used as additional motion-compensated prediction references in the higher representation (optionally enhancement-resolution) reference picture buffers (1162) of the enhancement layer (1152). The BL-to-EL RPU module (1166) at the encoder generates information of the prediction/up-sampling process and communicates this information ("RPU bitstream") (1174) to the identical BL-to-EL RPU (1254) of FIG. 12, which is located at the decoder module shown in FIG. 12. In this way, the encoder prediction operation may be duplicated at the decoder. Interpolation and prediction using this RPU module may comprise techniques that are disclosed in [Reference 6].

According to a further embodiment of the present disclosure, the internal buffers store frames at the enhancement resolution, and the decoder reconstructs internally and stores in the reference picture buffers the enhancement resolution frames for each data category. As a result, this embodiment does not use, for the purposes of display of the enhancement resolution data, the processing module of FIG. 10. Instead, in accordance with this embodiment, the enhancement resolution reconstructed frames may be extracted and displayed directly from the reference picture buffers of the enhancement layer. According to another embodiment of the present disclosure, the enhancement resolutions for each category are not equal. In this embodiment, the encoder and the decoder rescales the pictures in the buffers of the enhancement layer to some common enhancement resolution.

In an additional embodiment, the frame coded in the base layer may have the same size as that of the frames belonging to each category. In an additional embodiment, the reference picture buffers in the enhancement layers contain frames at the resolution of the original frames (full resolution).

According to an embodiment of the present disclosure, the frame-compatible domain, in which motion compensation is applied, may be identical to that of the base layer. In a further embodiment, the base layer may be interleaved in a side-by-side format, and the enhancement layer also codes a frame interleaved in the same side-by-side format.

According to an embodiment of the present disclosure, the base layer frame compatible format may comprise the even columns from the first view and the odd columns from the second view, while at the enhancement layer the frame compatible format may comprise the odd columns from the first view and the even columns from the second view.

According to an embodiment of the present disclosure, the layers may code frames at different spatial resolutions, in which case one could build a system with spatial scalability. According to a further embodiment, the codec system has a side-by-side frame-compatible base layer at 1280×720 and an enhancement layer that can reconstruct both views at 1920×1080. In this embodiment, the BL-to-EL RPU first de-multiplexes the frame-compatible data into separate categories and then may perform one of the following operations. In one scheme, the BL-to-EL RPU first interpolates the missing samples of that category and then rescales the resulting frame (1280×720) to the intended spatial resolution (1920×1080) before storing that resulting frame in the corresponding reference picture buffer in the enhancement layer. In a second scheme, the available and de-multiplexed samples are rescaled from a lower resolution to a higher resolution, for example, from 640×720 to 960×1080. Then, an additional interpolation operation determines the missing columns, and optionally also filters the existing samples to derive the full resolution frame.

According to an embodiment of the present disclosure, the multiple reference picture buffers in the enhancement layer may be controlled through memory management control operations (MMCO), such as those disclosed in [Reference 2]. MMCO operations control how reference pictures are added and removed from the buffers. According to a further embodiment, MMCO operations are transmitted for the enhancement layer. In this embodiment, either the sets of MMCOs for each reference picture buffer are the same, or one set of MMCO operations is signaled. This applies to both of the reference picture buffers. As a result, the operation of the picture buffers remains synchronized. A still further embodiment may use similar approaches for reference picture list modification/reordering signaling, including, but not limited to, the methods disclosed in [Reference 2].

The signaling information controls generation of the lists of the reference pictures in the buffers. These lists are then used in motion-compensated prediction. According to a further embodiment, the modification information is identical for the reference picture lists of each data category. In a still further embodiment, a single set of modification information is transmitted and will be applied to all the lists in the enhancement layer. According to further embodiments of the present disclosure, similar approaches are used in codecs utilizing signaling that controls the content of the reference picture buffers and signaling that controls the initialization and modification of its reference picture lists.

According to an embodiment of the present disclosure, the de-multiplexer and up-sampler RPU that derives the single-category frames at enhancement resolution before being stored into the reference picture buffers may be implemented as a reference processing unit as disclosed in [Reference 6].

According to another embodiment of the present disclosure, the base layer may code a representation with a first range of frequency content, while the additional enhancement layers may provide a second range of frequency content. Their output may be combined at the decoder to provide a better representation of the original data categories.

Figure 13:
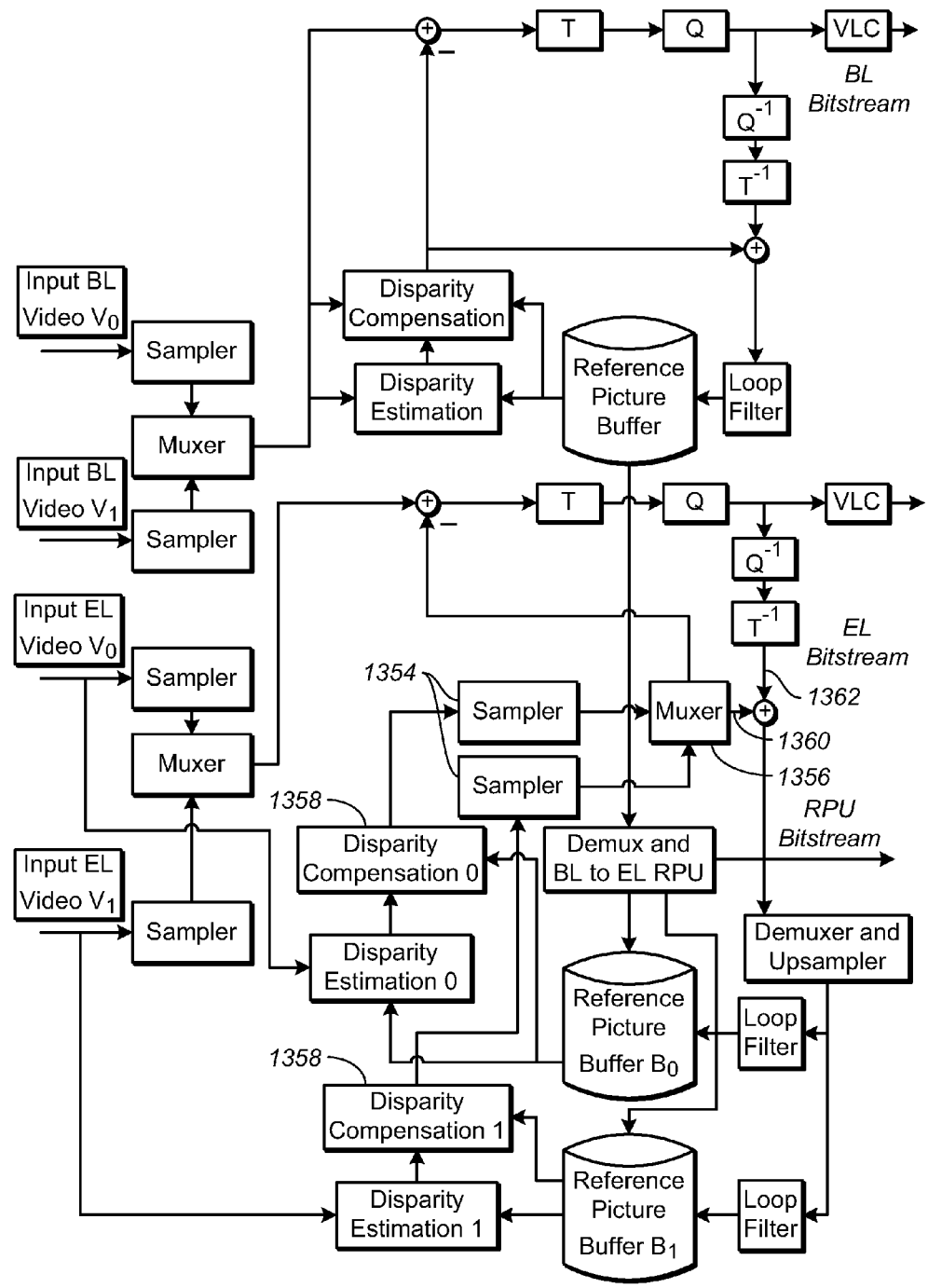
FIG. 13 depicts a multi-layer resolution-scalable 3D stereo video encoder, where the enhancement layer maintains two reference picture buffers, each one at enhancement resolution and performs motion/disparity compensation at enhancement resolution, in accordance with an embodiment of the present disclosure.
Figure 14:
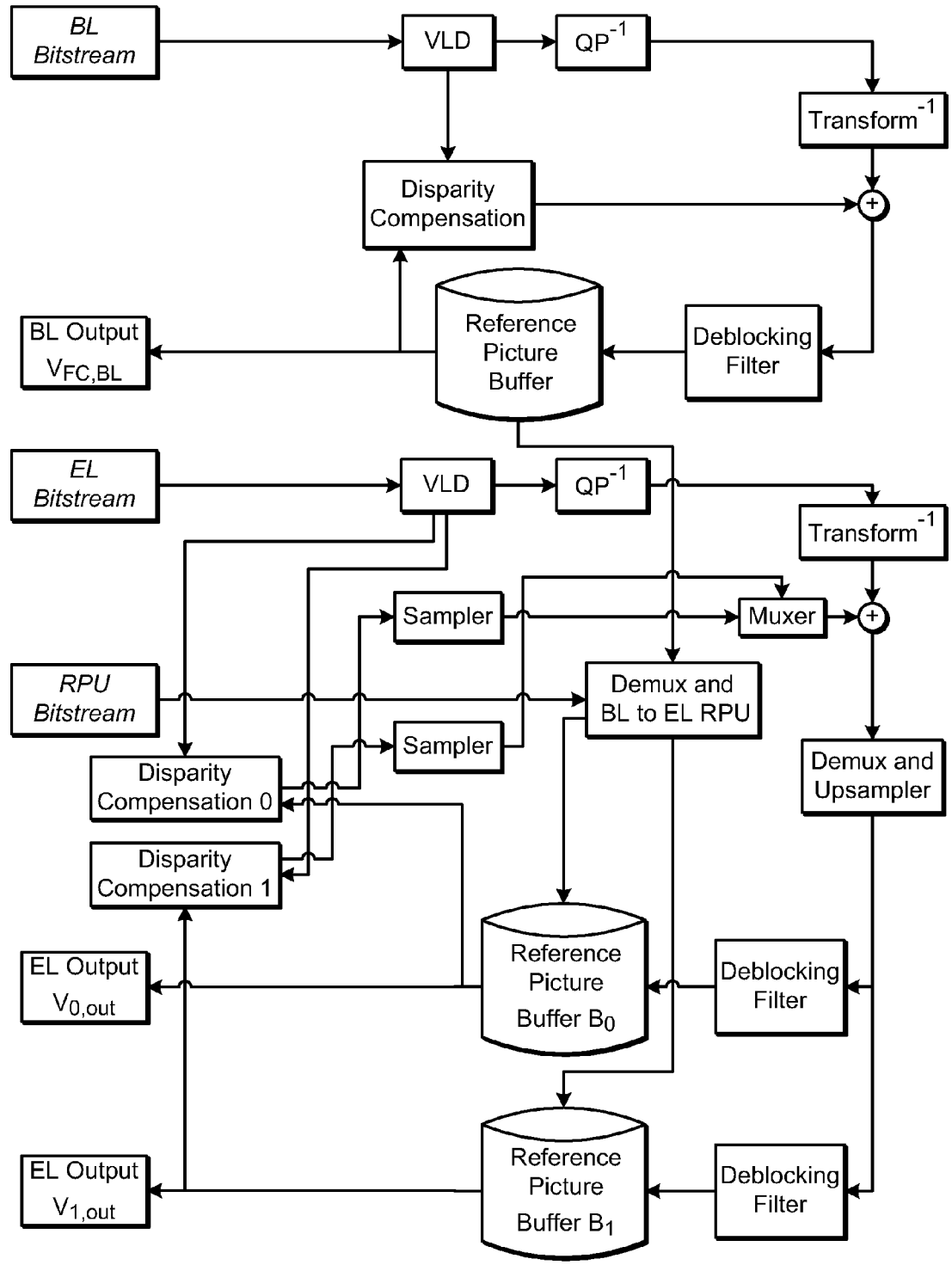
FIG. 14 depicts a multi-layer resolution-scalable 3D stereo video decoder, where the enhancement layer maintains two reference picture buffers, each one at enhancement resolution and performs motion/disparity compensation at enhancement resolution, in accordance with an embodiment of the present disclosure.

FIG. 13 shows a multi-layer resolution-scalable 3D stereo video encoder where the enhancement layer maintains two reference picture buffers, each one at enhancement resolution and performs motion/disparity compensation at enhancement resolution, in accordance with an embodiment of the present disclosure. FIG. 14 shows a decoder corresponding to the encoder shown in FIG. 13, in accordance with the embodiment of the present disclosure.

The embodiment shown in FIGS. 13 and 14 is similar to the embodiment shown in FIGS. 11 and 12. But, different from the embodiment shown in FIGS. 11 and 12, the samplers (1354) and the multiplexer (1356), according to the embodiment shown in FIG. 13, are placed after disparity compensation modules (1358). There are in fact as many disparity compensation modules (1358) as there are data categories. According to the embodiment shown in FIG. 13, which is for stereoscopic video delivery, there are two disparity compensation modules (1358), one for each view. After disparity compensation is performed on each higher-representation reference, the resulting frames are passed on to the samplers (1354) that perform a down-sampling process that may be preceded and/or succeeded by filtering (in the case of two views it will retain half of the samples). The down-sampled data from each data category are then fed to the multiplexer (1356), which generates a frame-compatible picture (1360). This frame-compatible picture (1360) is then used as the prediction to which the prediction residuals (1362) are added within the enhancement layer hybrid video coding loop.

According to the embodiment shown in FIG. 13, the disparity compensation module (1358) has more samples available (higher-representation pictures) and may be able to produce better predictors. In addition, the disparity compensation module may have more spatially accurate partitions in motion compensation. For example, when the side-by-side format is used, a partition size of 4×4 in a frame compatible reference picture is equivalent with a partition size of 8×4 in the full resolution picture. Similarly a partition of 16×16 is effectively a 32×16 partition in the full resolution picture. As a result, the disparity compensation module (1358) would have larger and more accurate partitions, in this embodiment.

According to the embodiment shown in FIG. 13, disparity estimation and compensation may be performed multiple times (e.g. twice) at the enhancement layer and thus increase system complexity. In addition, the benefits gained by the increased spatial accuracy for motion compensation are contingent on how the higher-representation reference pictures were up-sampled from the frame-compatible picture obtained by adding the prediction residual to the frame-compatible prediction picture $V_{FC,PRED}$ (1362) of FIG. 13. Also, according to this embodiment, the enhancement layer compresses twice the amount of motion vector information. According to a further embodiment, the reference picture buffers adopt the enhancement resolution, and the final reconstruction of each data category is performed as part of the generation of the references that are stored in the reference picture buffers of the enhancement layer. Consequently, this embodiment does not further process the output of the base and enhancement layers, unlike the decoder shown in FIG. 10.

According to a further embodiment of the present disclosure, the multi-layer codec may consider spatial scalability, similarly to our additional embodiment for the first method. A still further embodiment, similarly to the embodiment shown in FIGS. 11 and 12, provides the reference picture list modification and MMCO operations signaled to the decoder.

According to a further embodiment of the present disclosure, since there is sufficient correlation in motion parameters used in the multiple disparity/motion estimators and compensation modules, these motion parameters are selected to enable efficient prediction of parameters of one module from parameters from the other. In a still further embodiment, the motion parameters are selected to be identical and for each enhancement layer, only one set of parameters are sent. In another embodiment, a set of parameters for each module is signaled. Motion parameter prediction may also use information from neighboring or collocated parameters that are signaled from higher priority disparity estimation/compensation modules.

According to a further embodiment of the present disclosure, the frame coded in the base layer may have the same size as that of the frames belonging to each category. According to another embodiment, the reference picture buffers in the enhancement layers contain frames at the resolution of the original frames (full resolution). According to still another embodiment, the de-multiplexer and up-sampler that derives the single-category frames at enhancement resolution before being stored into the reference picture buffers may be implemented as a reference processing unit as disclosed in [Reference 6]. In still another embodiment, the base layer may code a representation with a first range of frequency content, while the additional enhancement layers may provide a second range of frequency content. Their output may be combined at the decoder to provide a better representation of the original data categories.

Figure 15:
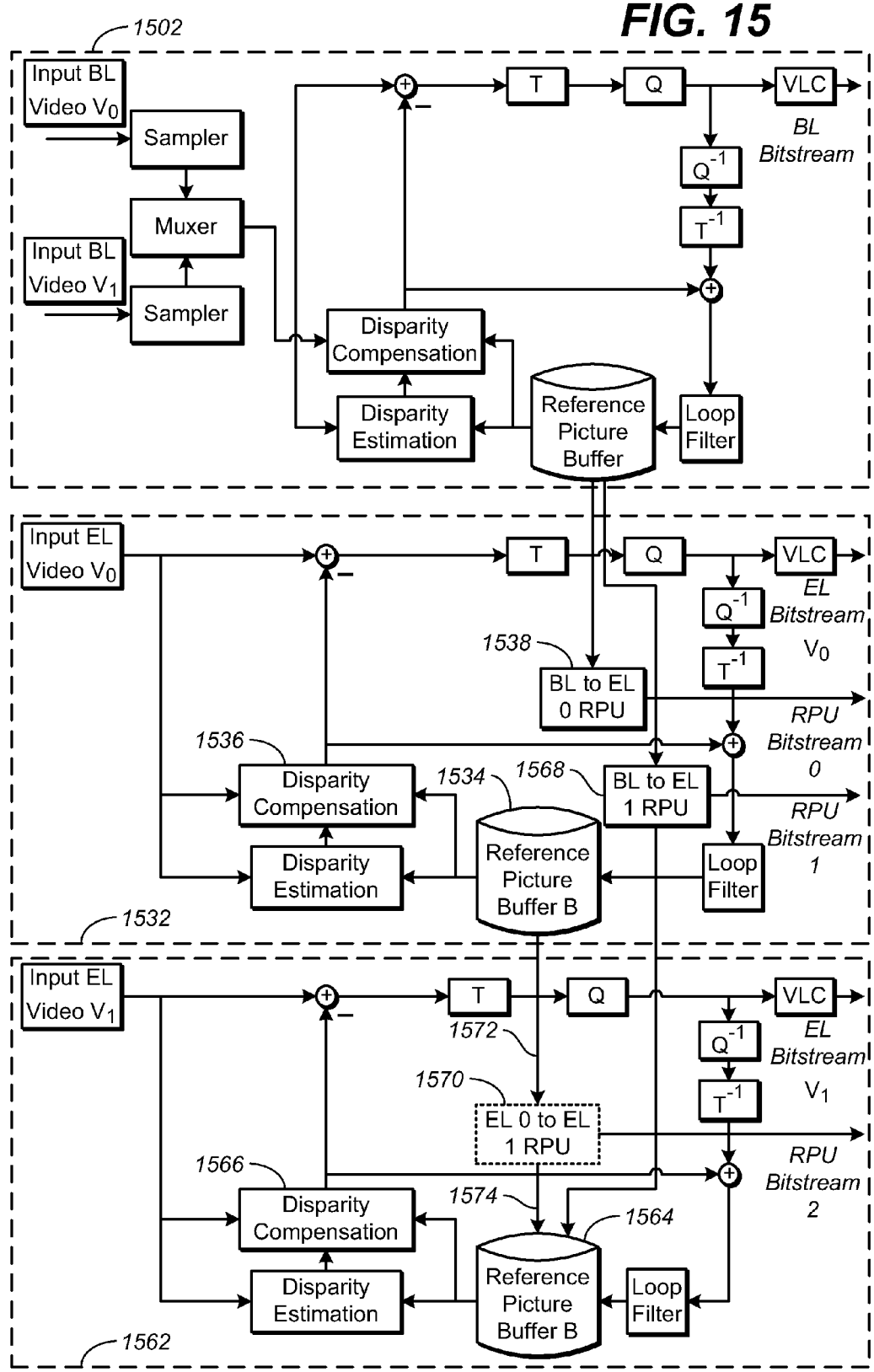
FIG. 15 depicts a multi-layer resolution-scalable video encoder, where the base layer codes a frame-compatible version of the data and the two enhancement layers code each one of the enhancement resolution data categories (each view for 3D stereoscopic video delivery), in accordance with an embodiment of the present disclosure.
Figure 16:
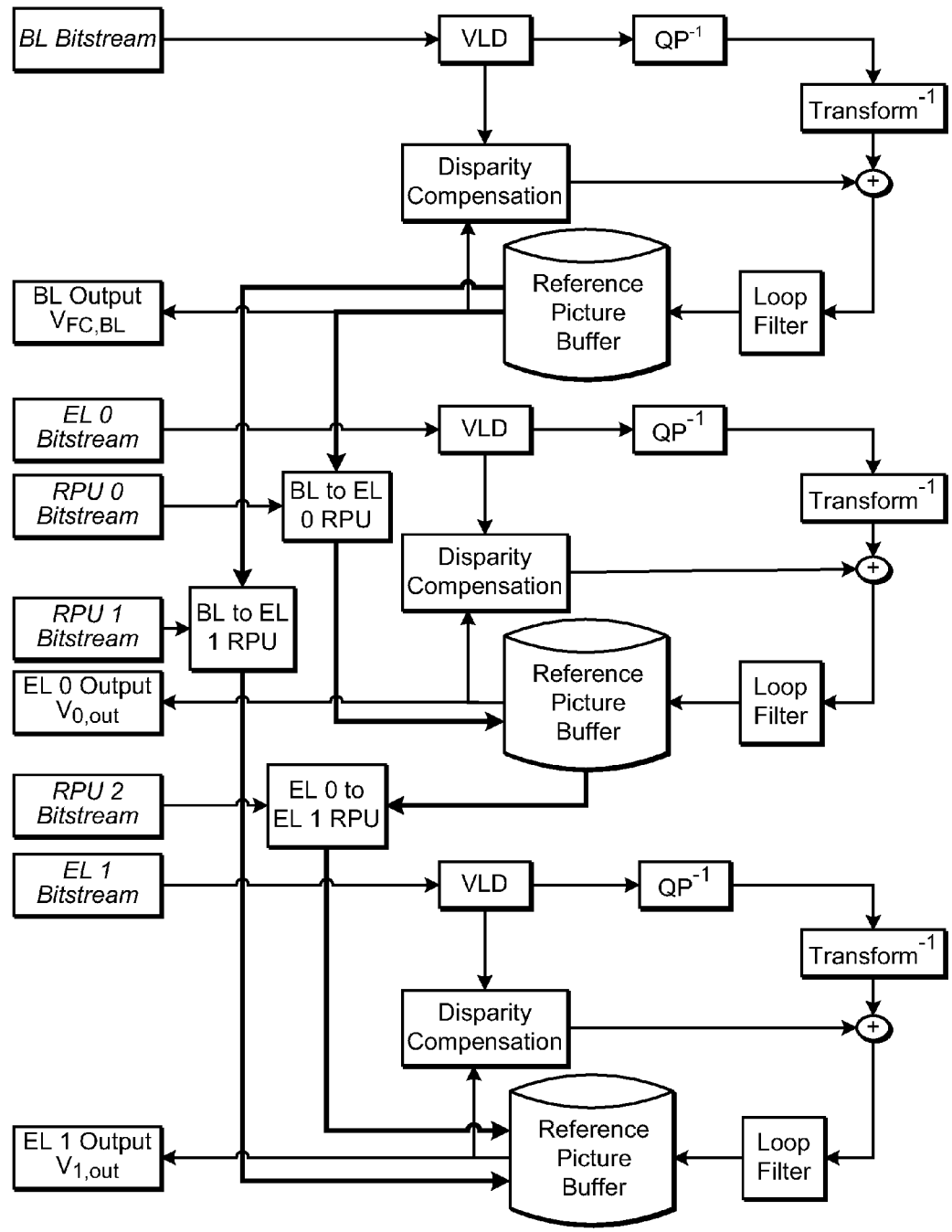
FIG. 16 depicts a multi-layer resolution-scalable video decoder, where the base layer codes a frame-compatible version of the data and the two enhancement layers code each one of the enhancement resolution data categories (each view for 3D stereoscopic video delivery), in accordance with an embodiment of the present disclosure.

FIG. 15 shows a multi-layer resolution-scalable video encoder, where the base layer (1502) encodes a frame-compatible version of the data and the two multiple enhancement layers (1532, 1562) encode each of the two enhancement resolution data categories (each view for the case of 3D stereoscopic video delivery), in accordance with an embodiment of the present disclosure. FIG. 16 shows a corresponding decoder, in accordance with the embodiment of the present disclosure.

According to the embodiment shown in FIG. 15, the architecture for the base layer (1502) is identical to that of the embodiments shown in FIGS. 11-14. According to the embodiment shown in FIG. 15, the base layer (1502) may encode a frame-compatible version of the multiple data categories. In this embodiment, an enhancement layer (1532, 1562) is provided for each data category. Each enhancement layer (1532, 1562) provides an enhancement resolution reconstruction of each data category, in accordance with a further embodiment for stereoscopic video delivery. According to this embodiment, each enhancement layer (1532, 1562) contains a single reference picture buffer (1534, 1564) and uses an architecture very similar to that of the base layer (1502). In this embodiment, the enhancement layers (1532, 1562) receive directly the enhancement (e.g. full) resolution frame of each category. In contrast, according to the embodiment shown in FIGS. 11-14, the input to the enhancement layers consists of frame-compatible representations of all data categories.

According to the embodiment shown in FIG. 15, the reference picture buffer (1534, 1564) of each layer (1532, 1562) stores references that may be used for motion-compensated prediction (1536, 1566). These references include past decoded frames of that same layer. According to a further embodiment, additional references in the enhancement layers (1532, 1562) may be inserted from the base layer (1502), as done with the MVC extension of H.264. In this embodiment, before being inserted, these references are processed with the RPU/pre-processor (1538, 1568) to derive processed references that correspond to the frames stored in the target reference picture buffer. According to a further embodiment for the stereoscopic video delivery, the base layer frame-compatible picture is de-multiplexed into samples belonging to different categories. The samples are then up-sampled within the RPU/preprocessor (1538, 1568) to enhancement (e.g. full) resolution before being stored in the reference pictures buffers (1534, 1564) of each enhancement layer (1532, 1562). According to this embodiment, the prediction, interpolation, and up-sampling processes within the RPU/preprocessor (1538, 1568) may adopt techniques disclosed in [Reference 6].

According to the embodiment shown in FIG. 15, separate RPUs (1538, 1568) may be implemented to produce each reference that will be stored in each of the enhancement layers' reference picture buffers (1534, 1564). According to another embodiment, a single module may be provided to jointly optimize and perform de-multiplexing and up-sampling of the base layer decoded frame-compatible picture into multiple full reference pictures, one for each enhancement layer.

According to another embodiment of the present disclosure, additional dependencies for the enhancement layer apart from the one to the base layer are provided. In this embodiment, an enhancement layer may depend on parsing and decoding another enhancement layer. With the continued reference to FIG. 15, the decoding process of enhancement layer 1 (1562) may also depend on enhancement layer 0 (1532), apart from the base layer (1502). Pictures (1572) stored in the reference picture buffer (1534) of enhancement layer 0 (1532) for display are fed into an additional RPU/preprocessor module (1570). The additional RPU/preprocessor (1570) processes the fed references inputs (1572) to be similar to the format of enhancement layer 1 (1562). The processed results (1574) are then stored into the reference picture buffer (1564) of enhancement layer 1 (1562) and are available for motion-compensated prediction (1566). According to a further embodiment for stereoscopic video delivery, each enhancement layer codes one of the views, and the RPU would process one view using motion and spatial processing in order to produce a reference picture that is closer to another view. According to still further embodiments, motion processing could include higher-order motion models such as the affine and perspective motion model.

According to a further embodiment, the multi-layer codec may consider spatial scalability, similarly to the embodiments shown in FIGS. 11-14. In this embodiment, the preprocessor modules (for example, 1538 and 1568 of FIG. 15) that perform prediction of the enhancement layers from the base layer will also comprise rescaling to the target layer resolution. The preprocessor module that predicts one enhancement layer from a second enhancement layer (for example, 1570 of FIG. 15) may also comprise rescaling if the enhancement layers do not have the same spatial resolution.

Figure 17:
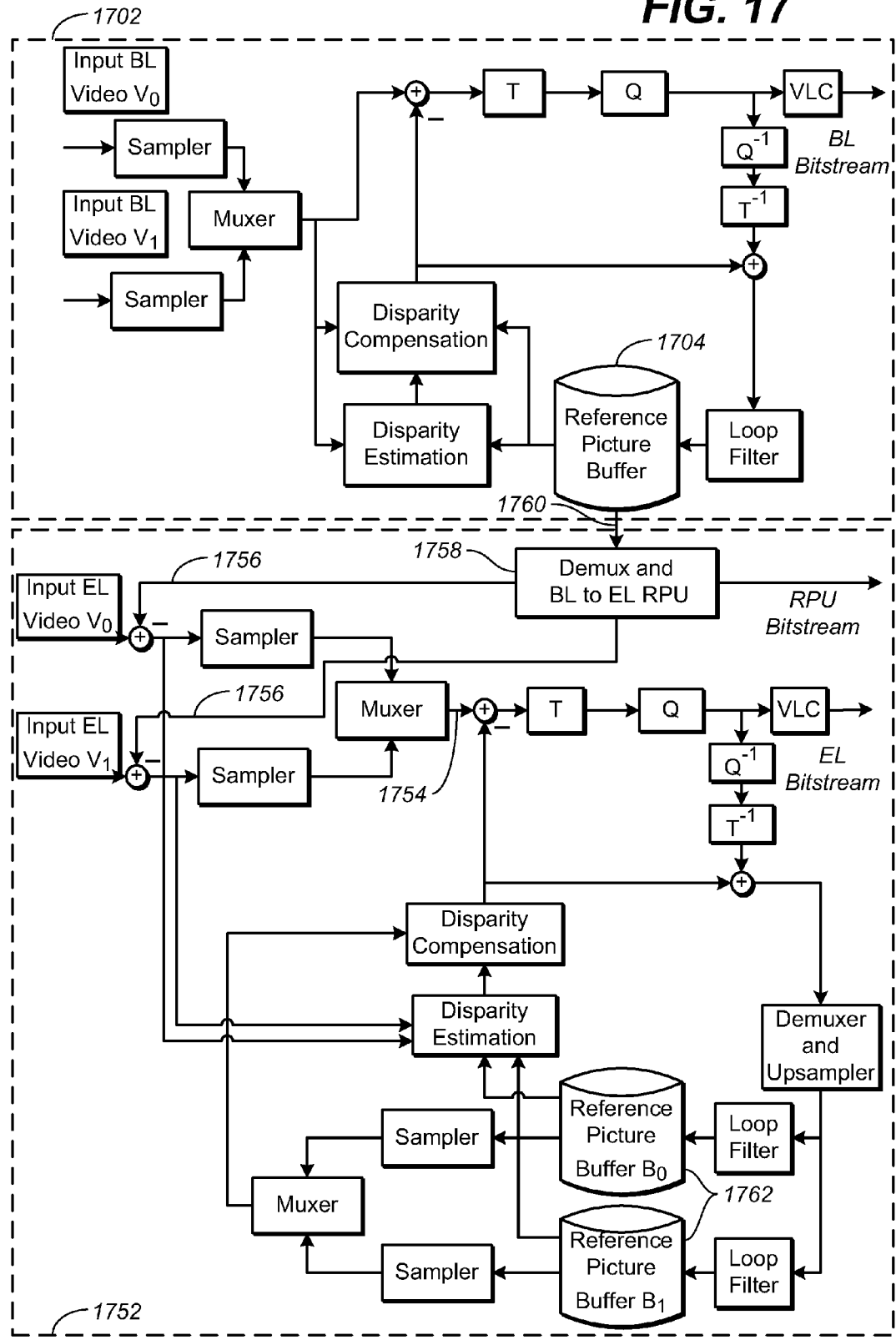
FIG. 17 depicts a multi-layer resolution-scalable 3D stereo video encoder, where the enhancement layer encodes residuals and maintains two reference picture buffers, each one at enhancement resolution and performs motion/disparity compensation in some reduced resolution (frame-compatible), in accordance with an embodiment of the present disclosure.
Figure 18:
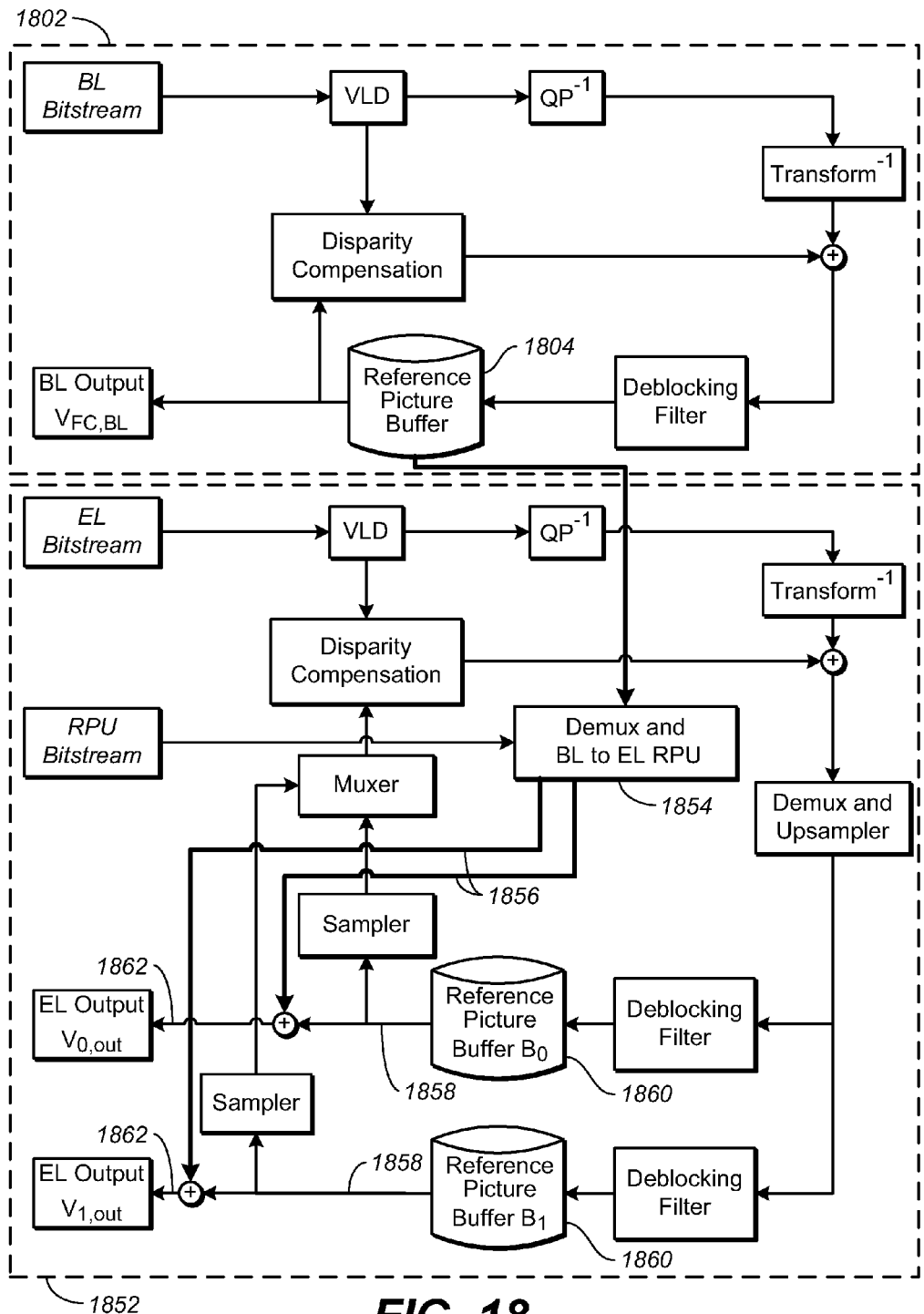
FIG. 18 depicts a multi-layer resolution-scalable 3D stereo video decoder, where the enhancement layer encodes residuals and maintains two reference picture buffers, each one at enhancement resolution and performs motion/disparity compensation in some reduced resolution (frame-compatible), in accordance with an embodiment of the present disclosure.

FIG. 17 shows a multi-layer resolution-scalable 3D stereo video encoder, where the enhancement layer encodes residuals and maintains two reference picture buffers, each one at enhancement resolution and performs motion/disparity compensation in some reduced resolution (frame-compatible), in accordance with an embodiment of the present disclosure. FIG. 18 shows a corresponding decoder, in accordance with the embodiment of the present disclosure.

According to the embodiment shown in FIG. 17, a base layer (1702) codes a frame-compatible signal, which can be further improved (in terms of resolution or spatial frequency content, among others) when decoding the one or more enhancement layers (1752) and combining them with the output of the base layer (1702). According to this embodiment, the enhancement layer (1752) encodes a filtered, sampled, and multiplexed residual (1754) [Reference 7] that is a result of subtracting a prediction (1756) of the original full resolution data category frame. This prediction (1756) is a result of using an RPU processor (1758) that has as input decoded pictures (1760) from the frame-compatible base layer (1702) and outputs predictions (1756) of the original frame categories at the original (full) resolutions. In a further embodiment, the RPU (1758) may use techniques such as those disclosed in [Reference 6], including filtering, interpolation, rescaling, etc. According to the embodiment shown in FIG. 17, the internal picture buffers (1762) of the enhancement layer (1752) does not receive processed references from the base layer buffer (1704) via an RPU.

At the decoder shown in FIG. 18, a similar RPU (1854) takes as input the decoded base layer picture from the picture buffer (1804) of the base layer (1802), processes it to the original (full) resolution to derive full resolution frames (1856) for each category and then adds those frames (1856) to the frames (1858) already decoded in the enhancement layer reference picture buffers (1860) to yield the final reconstructed frame (1862) for each data category.

All the further embodiments according to the embodiment shown in FIGS. 11 and 12 that do not conflict with the differences between the embodiment shown in FIGS. 11 and 12 and the embodiment shown in FIGS. 17 and 18 apply also to further embodiment according to the embodiment shown in FIGS. 17 and 18. According to a further embodiment, the resolutions of the base layer and that of the enhancement layers and the internal reference picture buffers of the enhancement layers may be different.

In a further embodiment according to the embodiment shown in FIGS. 17 and 18, the enhancement layer provides multiple disparity compensation modules, one for each reference picture buffer of each data category, similarly to the embodiment shown in FIGS. 13 and 14. All applicable further embodiments according to the embodiment shown in FIGS. 13 and 14 apply here as well.

Figure 19:
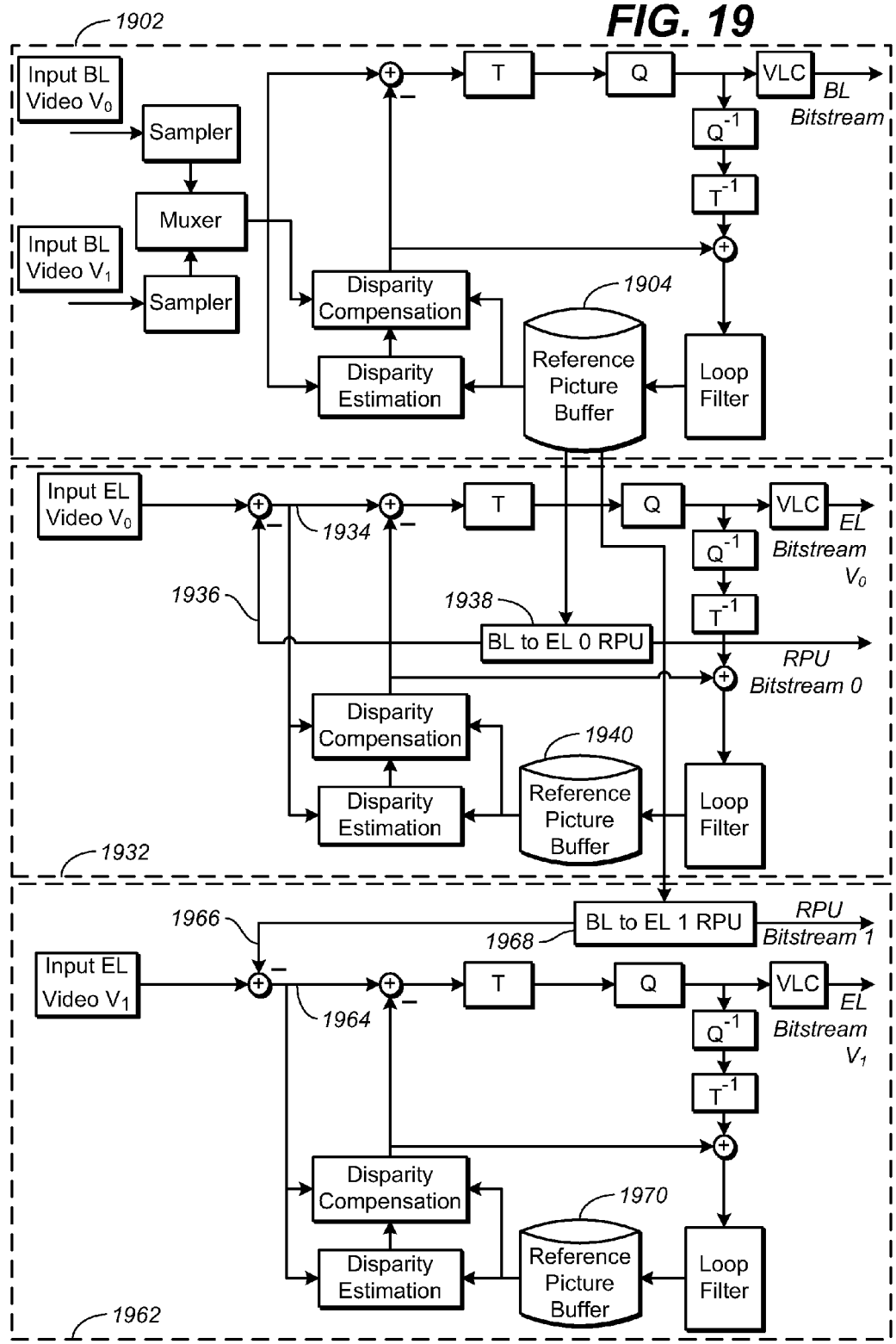
FIG. 19 depicts a multi-layer resolution-scalable video encoder where the base layer codes a frame-compatible version of the data and the two enhancement layers code residuals for each one of the enhancement resolution data categories (each view for 3D stereoscopic video delivery), in accordance with an embodiment of the present disclosure.
Figure 20:
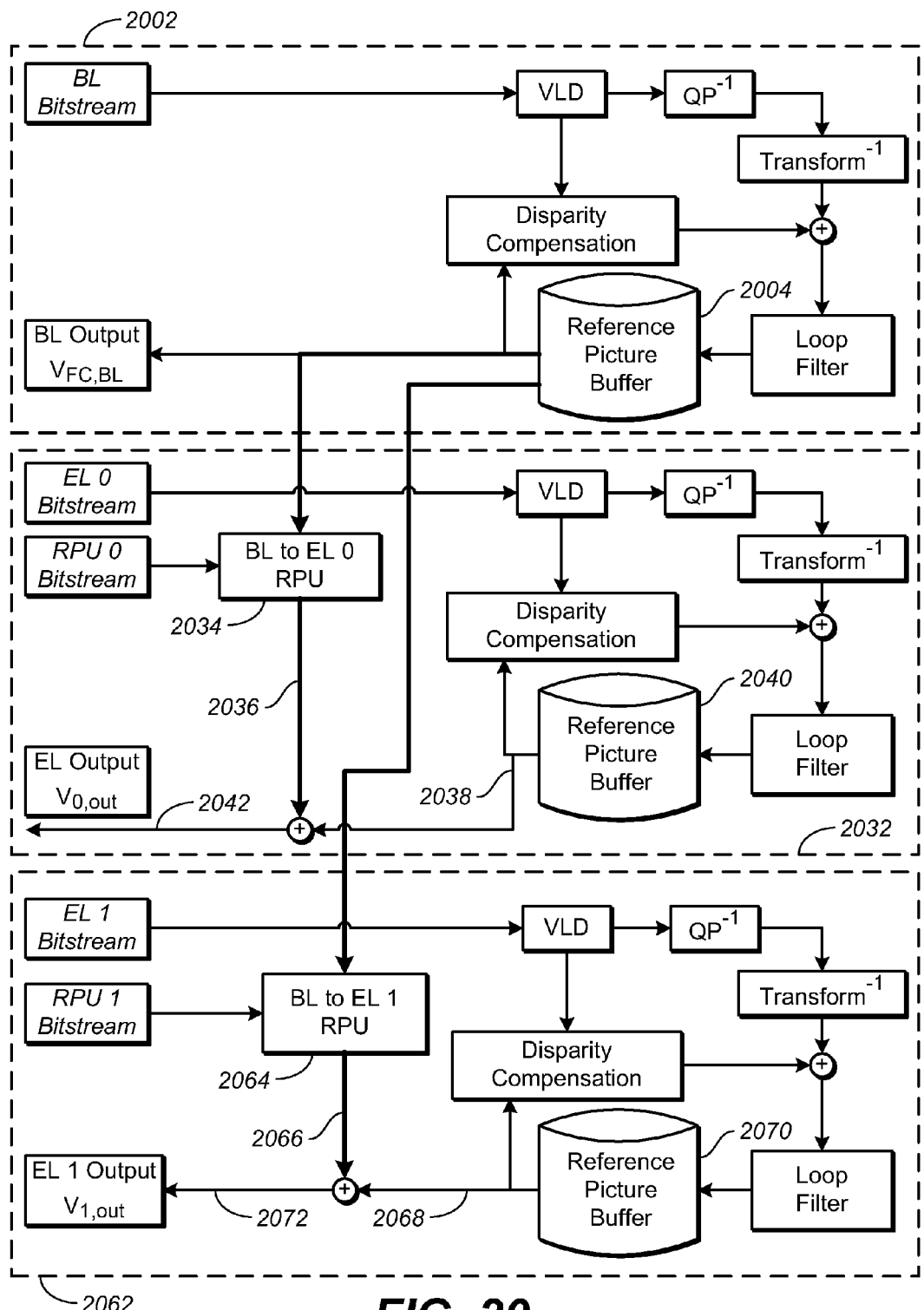
FIG. 20 depicts a multi-layer resolution-scalable video decoder where the base layer codes a frame-compatible version of the data and the two enhancement layers code residuals for each one of the enhancement resolution data categories (each view for 3D stereoscopic video delivery), in accordance with an embodiment of the present disclosure.

FIG. 19 shows a multi-layer resolution-scalable video encoder, where the base layer codes a frame-compatible version of the data and the two enhancement layers code residuals for each of the enhancement resolution data categories (each view for 3D stereoscopic video delivery), in accordance with an embodiment of the present disclosure. FIG. 20 shows a corresponding decoder, in accordance with the embodiment of the present disclosure.

According to the embodiment shown in FIG. 19, the enhancement layers (1932, 1962) adopt residual coding, similar to the embodiment shown in FIGS. 17 and 18. According to this embodiment, each enhancement layer (1932, 1962) corresponds to each data category and encodes a residual (1934, 1964) [Reference 7] that is a result of subtracting a prediction (1936, 1966) of the original full resolution data category frame. This prediction is a result of using an RPU processor (1938, 1968) for each enhancement layer (1932, 1962) that has as input decoded pictures from the frame-compatible base layer (1902) and outputs predictions (1936, 1966) of the original frame categories at the original (full) resolution of the given layer. According to a further embodiment, the RPU (1938, 1968) may use techniques such as those disclosed in [Reference 6], including filtering, interpolation, resealing, etc. According to the embodiment shown in FIG. 19, the internal picture buffer (1940, 1970) of the enhancement layer (1932, 1962) does not receive processed references from the base layer buffer (1904) via an RPU.

At the decoder shown in FIG. 20, for each enhancement layer (2032, 2062), a similar RPU (2034, 2064) takes as input the decoded base layer picture from the picture buffer (2004) of the base layer (2002), processes it to the original (full) resolution to derive a full resolution frame (2036, 2066) for the given category and then adds this frame (2036, 2066) to the frame (2038, 2068) already decoded in the enhancement layer reference picture buffer (2040, 2070) to yield the final reconstructed frame (2042, 2072) for the given data category.

All the further embodiments according to the embodiment shown in FIGS. 15 and 16 that do not conflict with the differences between the embodiment shown in FIGS. 15 and 16 and the embodiment shown in FIGS. 19 and 20 apply also to further embodiment according to the embodiment shown in FIGS. 19 and 20. According to a further embodiment, the resolutions of the base layer and that of the enhancement layers and the internal reference picture buffers of the enhancement layers may be different. And, the resolutions of each enhancement layer may differ.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

Thus, embodiments of the present invention have been described, which relate to one or more of the example embodiments that are enumerated ordinally, directly below.

Accordingly, the invention may be embodied in any of the forms described herein, including, but not limited to the following Enumerated Example Embodiments (EEEs) which described structure, features, and functionality of some portions of the present invention:

EEE1. A encoding method for multi-layered frame-compatible video delivery, comprising:
    a) base layer processing images or video frames of multiple data categories through a base layer, comprising:
        i) providing a base layer frame-compatible representation of the images or video frames of the multiple data categories; and
    b) enhancement layer processing the images or video frames of multiple data categories through one or more enhancement layers, comprising:
        i) providing a enhancement layer frame-compatible representation of the images or video frames of the multiple data categories;
        ii) maintaining at least one enhancement layer reference picture buffer;
        iii) reference processing at least one dependency on the base layer or a different enhancement layer; and
        iv) performing motion or disparity compensation,
        wherein each of said one or more enhancement layer processes all the multiple data categories.

EEE2. The encoding method according to enumerated example embodiment 1, wherein the multiple data categories comprise multiple views for stereoscopic images or videos.

EEE3. The encoding method according to enumerated example embodiment 1 or 2, wherein the providing of a base layer frame-compatible representation of the images or video frames of the multiple data categories comprises:
    base layer sampling and base layer multiplexing the images or video frames of multiple data categories into a single frame.

EEE4. The encoding method according to any one of enumerated example embodiments 1-3, wherein the base layer processing conforms to one of a plurality of existing video codecs.

EEE5. The encoding method according enumerated example embodiment 4, wherein the plurality of existing video codecs comprise H.264/AVC, VP8, and VC-1.

EEE6. The encoding method according to any one of enumerated example embodiment 3-5, wherein the sampling of the base layer processing comprises symmetric or asymmetric filtering of the images or video frames of the multiple data categories.

EEE7. The encoding method according to any one of enumerated example embodiments 3-6, wherein the base layer sampling comprises horizontal sampling, vertical sampling, or quincunx sampling.

EEE8. The encoding method according to any one of enumerated example embodiments 3-7, wherein the base layer multiplexing uses any one frame-compatible packing arrangement of checkerboard interleaved arrangement, column interleaved arrangement, row interleaved arrangement, side by side arrangement, and over-under arrangement.

EEE9. The encoding method according to any one of enumerated example embodiments 2-8, wherein the base layer processing further comprises processing equal or unequal amount of samples of the images or video frames of the multiple views.

EEE10. The encoding method according to any one of enumerated example embodiments 2-9, wherein the enhancement layer processing adopts a hybrid video coding model, said hybrid video coding model conforming to any one of a plurality of existing codecs.

EEE11. The encoding method according to enumerated example embodiment 10, wherein the plurality of existing codecs comprise VC-1 and H.264/AVC.

EEE12. The encoding method according to any one of enumerated example embodiments 2-11, wherein the enhancement layer processing further comprises:
    generating at least one reference image or video frame by predicting at least one predicted image from samples in the same image or frame or from samples from past decoded frames in the same enhancement layer, and storing the at least one reference image or video frame in the at least one enhancement layer reference picture buffer.

EEE13. The encoding method according to enumerated example embodiment 12, where the generation of the at least one reference image or video frame further comprises de-multiplexing and reference processing the sum of at least one prediction residual image and the at least one predicted image.

EEE14. The encoding method according to enumerated example embodiment 13, wherein the de-multiplexing further comprises upsampling and interpolating the sum of the at least one prediction residual image and the at least one predicted image.

EEE15. The encoding method according to any one of enumerated example embodiments 2-14, wherein one of the at least one enhancement layer reference picture buffer stores images or video frames at different resolutions from the rest of the at least one enhancement layer reference picture buffer.

EEE16. The encoding method according to any one of enumerated example embodiments 1-15, wherein the enhancement layer processing further comprises:
  selecting at least one reference image from the at least one enhancement layer reference picture buffer for each of the multiple data categories;
  enhancement layer sampling and enhancement layer multiplexing the selected at least one reference image into at least one frame-compatible image; and
  performing disparity compensation or inter prediction based on the at least one frame-compatible image.

EEE17. The encoding method according to enumerated example embodiment 16, wherein
  the enhancement layer sampling of the selected at least one reference image comprises any one of horizontal sampling, vertical sampling, or quincunx sampling; and
  the enhancement layer multiplexing of the selected at least one reference image uses any one frame-compatible packing arrangement of checkerboard interleaved arrangement, column interleaved arrangement, row interleaved arrangement, side by side arrangement, and over-under arrangement.

EEE18. The encoding method according to enumerated example embodiment 16 or 17, wherein the enhancement layer processing further comprises:
  base layer to enhancement layer (BL-to-EL) processing at least one base layer decoded frame compatible image from a reference buffer in the base layer; and
  storing the BL-to-EL processed at least one base layer decoded frame compatible image in the at least one enhancement layer reference picture buffer.

EEE19. The encoding method according to enumerated example embodiment 18, wherein the BL-to-EL processing comprises reference processing, de-multiplexing and up-sampling the at least one base layer decoded frame compatible image.

EEE20. The encoding method according to enumerated example embodiment 19, wherein the BL-to-EL processing further comprises: filtering, upscaling, and interpolating the at least one base layer decoded frame compatible image.

EEE21. The encoding method according to any one of enumerated example embodiments 18-20, wherein the enhancement layer processing further comprises providing information regarding the BL-to-EL processing to a corresponding decoder.

EEE22. The encoding method according to any one of enumerated example embodiments 1-21, wherein the at least one enhancement layer reference picture buffer store images at an identical or different enhancement resolution for each one of the multiple data categories.

EEE23. The encoding method according to any one of enumerated example embodiments 1-22, wherein the at least one enhancement layer reference picture buffer store images at same resolution as original input images.

EEE24. The encoding method according to any one of enumerated example embodiments 1-23, wherein the base layer multiplexing and the enhancement layer multiplexing use the same frame-compatible packing arrangement.

EEE25. The encoding method according to any one of 18-24, wherein the base layer processing and the enhancement layer processing process images at different spatial resolutions.

EEE26. The encoding method according to enumerated example embodiment 25, wherein the BL-to-EL processing comprises:
  de-multiplexing the at least one base layer decoded frame compatible image;
  interpolating the de-multiplexed at least one base layer decoded frame compatible image; and
  resealing the interpolated, de-multiplexed at least one base layer decoded frame compatible image to a target spatial resolution.

EEE27. The encoding method according to enumerated example embodiment 25, wherein the BL-to-EL processing comprises:
  de-multiplexing the at least one base layer decoded frame compatible image;
  resealing the de-multiplexed at least one base layer decoded frame compatible image to a different spatial resolution; and
  interpolating the de-multiplexed, resealed at least one base layer decoded frame compatible image to a target spatial resolution.

EEE28. The encoding method according to enumerated example embodiment 27, further comprising filtering de-multiplexed, resealed at least one base layer decoded frame compatible image to a target spatial resolution.

EEE29. The encoding method according to any one of enumerated example embodiments 1-28, wherein the enhancement layer processing further comprises controlling the at least one enhancement layer reference picture buffer through memory management control operations (MMCOs).

EEE30. The encoding method according to enumerated example embodiment 29, wherein each of the at least one enhancement layer reference picture buffer is synchronized according to one or more sets of MMCOs.

EEE31. The encoding method according to enumerated example embodiment 29 or 30, wherein the enhancement layer processing further comprises providing information regarding the MMCOs to a corresponding decoder.

EEE32. The encoding method according to any one of enumerated example embodiments 1-31, wherein the base layer processing encodes image contents in a first range of frequencies and the enhancement layer processing encodes image contents in a second range of frequencies.

EEE33. The encoding method according to any one of enumerated example embodiments 1-15, wherein the enhancement layer processing further comprises:
  selecting at least one reference image from the at least one enhancement layer reference picture buffer for each of the multiple data categories;

obtaining at least one compensated image for each of the multiple data categories by performing disparity compensation or inter prediction based on the at least one reference image; and enhancement layer sampling and enhancement layer multiplexing the at least one compensated image into at least one frame-compatible image.

EEE34. The encoding method according to enumerated example embodiment 33, wherein the enhancement layer processing further comprises controlling the at least one enhancement layer reference picture buffer through memory management control operations (MMCOs).

EEE35. The encoding method according to enumerated example embodiment 34, wherein the enhancement layer processing further comprises providing information regarding the MMCOs to a corresponding decoder.

EEE36. The encoding method according to any one of enumerated example embodiments 33-35, wherein the at least one enhancement layer reference picture buffer store images at an identical or different enhancement resolution for each of the multiple data categories.

EEE37. The encoding method according to any one of enumerated example embodiments 33-36, wherein the at least one enhancement layer reference picture buffer store images at same resolution as original input images.

EEE38. The encoding method according to any one of enumerated example embodiments 33-37, wherein the base layer processing encodes image contents in a first range of frequencies and the enhancement layer processing encodes image contents in a second range of frequencies.

EEE39. An encoding method for multi-layered frame-compatible video delivery, comprising:
  a) base layer processing images or video frames of multiple data categories through a base layer, comprising:
    i) providing a base layer frame-compatible representation of the images or video frames of the multiple data categories; and
  b) enhancement layer processing the images or video frames of multiple data categories through one or more enhancement layers, wherein each of the multiple data categories is processed separately in a separate enhancement layer, each of the one or more enhancement layers comprising:
    i) providing an enhancement layer representation of images or videos for one of the multiple data categories;
    ii) maintaining a enhancement layer reference picture buffer in each enhancement layer;
    iii) reference processing at least one dependency on the base layer or a different enhancement layer; and
    iv) performing motion or disparity compensation.

EEE40. The encoding method according to enumerated example embodiment 39, wherein the multiple data categories comprise multiple views for stereoscopic images or videos.

EEE41. The encoding method according to enumerated example embodiment 39 or 40, wherein the providing of a base layer frame-compatible representation of the images or video frames of multiple data categories comprising:
  base layer sampling and base layer multiplexing the images or video frames of multiple data categories into a single frame.

EEE42. The encoding method according to any one of enumerated example embodiments 39-41, wherein the base layer processing conform to one of a plurality of existing video codecs.

EEE43. The encoding method according to enumerated example embodiment 42, wherein the plurality of existing video codecs comprise H.264/AVC, VP8, and VC-1.

EEE44. The encoding method according to any one of enumerated example embodiment 41-43, wherein the sampling of the base layer processing comprises symmetric or asymmetric filtering of the images or video frames of multiple data categories.

EEE45. The encoding method according to any one of enumerated example embodiments 41-44, wherein the base layer sampling comprises horizontal sampling, vertical sampling, or quincunx sampling.

EEE46. The encoding method according to any one of enumerated example embodiments 41-45, wherein the base layer multiplexing uses any one frame-compatible packing arrangement of checkerboard interleaved arrangement, column interleaved arrangement, row interleaved arrangement, side by side arrangement, and over-under arrangement.

EEE47. The encoding method according to any one of enumerated example embodiments 40-46, wherein the base layer processing further comprises processing equal or unequal amount of samples of the images or video frames of the multiple views.

EEE48. The encoding method according to any one of enumerated example embodiments 40-47, wherein the encoding layer processing adopts a hybrid video coding model, said hybrid video coding model conforming to any one of a plurality of existing codecs.

EEE49. The encoding method according to enumerated example embodiment 48, wherein the plurality of existing codecs comprise VC-1 and H.264/AVC.

EEE50. The encoding method according to any one of enumerated example embodiments 39-49, wherein the performing of motion or disparity compensation is based on at least one image stored in the enhancement layer reference picture buffer.

EEE51. The encoding method according to any one of enumerated example embodiments 39-49, wherein the enhancement layer processing further comprises:
  base layer to enhancement layer (BL-to-EL) processing at least one base layer decoded frame compatible image from a reference buffer in the base layer; and
  storing the BL-to-EL processed at least one base layer decoded frame compatible image in the at least one enhancement layer reference picture buffer.

EEE52. The encoding method according to enumerated example embodiment 51, wherein the BL-to-EL processing comprises reference processing, de-multiplexing and up-sampling the at least one base layer decoded frame compatible image.

EEE53. The encoding method according to enumerated example embodiment 52, wherein the BL-to-EL processing of each of the one or more enhancement layers is handled by a single processing unit that jointly performs and optimizes the reference processing, de-multiplexing and up-sampling of the at least one base layer decoded frame compatible image.

EEE54. The encoding method according to any one of enumerated example embodiments 39-53, wherein the enhancement layer processing further comprises:
  enhancement layer to enhancement layer (EL-to-EL) processing at least one reference image stored in an enhance layer reference picture buffer in a different enhancement layer; and
  storing the EL-to-EL processed at least one enhancement layer reference image in the at least one enhancement layer reference picture buffer thereof.

EEE55. The encoding method according to any one of enumerated example embodiments 51-54, wherein the BL-to-EL processing further comprises resealing the BL-to-EL processed at least one base layer decoded frame compatible image to a target spatial resolution.

EEE56. The encoding method according to enumerated example embodiment 54 or 55, wherein the EL-to-EL processing further comprises resealing the EL-to-EL processed at least one enhancement layer reference image to a target spatial resolution.

EEE57. The encoding method according to enumerated example embodiment 1, wherein the providing of the enhancement layer frame-compatible representation of the images or video frames of the multiple data categories comprises:

filtering, sampling and multiplexing difference images of original full resolution images of the multiple data categories and at least one base layer to enhancement layer (BL-to-EL) prediction.

EEE58. The encoding method according to enumerated example embodiment 57, wherein the at least one BL-to-EL prediction is obtained by de-multiplexing and reference processing at least one frame-compatible decoded picture from the base layer.

EEE59. The encoding method according to enumerated example embodiment 58, wherein the de-multiplexing and reference processing further comprises filtering, interpolation, or resealing.

EEE60. The encoding method according to enumerated example embodiment 57, wherein the motion or disparity compensation is performed for each of the multiple data categories.

EEE61. The encoding method according to enumerated example embodiment 39, wherein the providing of the enhancement layer representation of images or videos for one of the multiple data categories comprises obtaining at least one difference image of at least one original full resolution image for the one of the multiple data categories and at least one base layer to enhancement layer (BL-to-EL) prediction.

EEE62. The encoding method according to enumerated example embodiment 61, wherein the at least one BL-to-EL prediction is obtained by de-multiplexing and reference processing at least one frame-compatible decoded picture from the base layer.

EEE63. The encoding method according to enumerated example embodiment 62, wherein the de-multiplexing and reference processing further comprises filtering, interpolation, or resealing.

EEE64. A decoding method for multi-layered frame-compatible video delivery, comprising:

a) base layer processing a plurality of base layer bitstream signals through a base layer, comprising:
   i) providing at least one frame-compatible base layer decode image or video frame; and
b) enhancement layer processing a plurality of enhancement bitstream signals through one or more enhancement layers, comprising:
   i) providing at least one enhancement layer-decoded image or video frame for multiple data categories;
   ii) maintaining at least one enhancement layer reference picture buffer;
   iii) reference processing at least one dependency on the base layer or a different enhancement layer; and
   iv) performing disparity compensation,
wherein all the multiple data categories are decoded and processed in the same enhancement layer.

EEE65. The decoding method according to enumerated example embodiment 64, wherein the multiple data categories comprise multiple views for stereoscopic images or videos.

EEE66. The decoding method according to enumerated example embodiment 64 or 65, wherein the base layer processing conforms to one of a plurality of existing video codecs.

EEE67. The decoding method according enumerated example embodiment 66, wherein the plurality of existing video codecs comprise H.264/AVC, VP8, and VC-1.

EEE68. The decoding method according to any one of enumerated example embodiments 64-67, wherein the enhance layer processing adopts a hybrid video coding model, said hybrid video coding model conforming to any one of a plurality of existing codecs.

EEE69. The decoding method according to enumerated example embodiment 68, wherein the plurality of existing codecs comprise VC-1 and H.264/AVC.

EEE70. The decoding method according to any one of enumerated example embodiments 64-69, wherein the enhancement layer processing further comprises:

generating at least one reference image or video frame by predicting at least one predicted image from samples in the same image or frame or from samples from past decoded frames in the same enhancement layer, and storing the at least one reference image or video frame in the at least one enhancement layer reference picture buffer.

EEE71. The decoding method according to enumerated example embodiment 70, where the generation of the at least one reference image or video frame further comprises de-multiplexing and reference processing the sum of at least one image decoded from the plurality of enhancement layer bitstream signals and the at least one predicted image.

EEE72. The decoding method according to enumerated example embodiment 71, wherein the de-multiplexing further comprises upsampling and interpolating the sum of the at least one prediction residual image and the at least one predicted image.

EEE73. The decoding method according to any one of enumerated example embodiments 65-72, wherein one of the at least one enhancement layer reference picture buffer stores images or video frames at different resolutions from the rest of the at least one enhancement layer reference picture buffer.

EEE74. The decoding method according to any one of enumerated example embodiments 64-73, wherein the enhancement layer processing further comprises:

selecting at least one reference image from the at least one enhancement layer reference picture buffer for each of the multiple data categories;

enhancement layer sampling and enhancement layer multiplexing the selected at least one reference image into at least one frame-compatible image; and performing disparity compensation or inter prediction based on the at least one frame-compatible image.

EEE75. The decoding method according to enumerated example embodiment 73 or 74, wherein the enhancement layer processing further comprises:

base layer to enhancement layer (BL-to-EL) processing at least one base layer decoded frame compatible image from a reference buffer in the base layer; and storing the BL-to-EL processed at least one base layer decoded frame compatible image in the at least one enhancement layer reference picture buffer.

EEE76. The decoding method according to enumerated example embodiment 75, wherein the BL-to-EL processing comprises reference processing, de-multiplexing and up-sampling the at least one base layer decoded frame compatible image.

EEE77. The decoding method according to enumerated example embodiment 76, wherein the BL-to-EL processing further comprises: filtering, upscaling, and interpolating the at least one base layer decoded frame compatible image.

EEE78. The decoding method according to any one of enumerated example embodiments 75-77, wherein the enhancement layer processing further comprises receiving information regarding the BL-to-EL processing from a corresponding encoder.

EEE79. The decoding method according to any one of enumerated example embodiments 75-78, wherein the base layer processing and the enhancement layer processing process images at different spatial resolutions.

EEE80. The decoding method according to enumerated example embodiment 79, wherein the BL-to-EL processing comprises:
  de-multiplexing the at least one base layer decoded frame compatible image;
  interpolating the de-multiplexed at least one base layer decoded frame compatible image; and
  resealing the interpolated, de-multiplexed at least one base layer decoded frame compatible image to a target spatial resolution.

EEE81. The decoding method according to enumerated example embodiment 79, wherein the BL-to-EL processing comprises:
  de-multiplexing the at least one base layer decoded frame compatible image;
  resealing the de-multiplexed at least one base layer decoded frame compatible image to a different spatial resolution; and
  interpolating the de-multiplexed, resealed at least one base layer decoded frame compatible image to a target spatial resolution.

EEE82. The decoding method according to enumerated example embodiment 81, further comprising filtering de-multiplexed, resealed at least one base layer decoded frame compatible image to a target spatial resolution.

EEE83. The decoding method according to any one of enumerated example embodiments 64-82, wherein the enhancement layer processing further comprises controlling the at least one enhancement layer reference picture buffer through memory management control operations (MMCOs).

EEE84. The decoding method according to enumerated example embodiment 83, wherein each of the at least one enhancement layer reference picture buffer is synchronized according to one or more sets of MMCOs.

EEE85. The decoding method according to enumerated example embodiment 83 or 84, wherein the enhancement layer processing further comprises receiving information regarding the MMCOs from a corresponding encoder.

EEE86. The decoding method according to any one of enumerated example embodiments 64-67, wherein the enhancement layer processing further comprises:
  selecting at least one reference image from the at least one enhancement layer reference picture buffer for each of the multiple data categories;
  obtaining at least one compensated image for each of the multiple data categories by performing disparity compensation or inter prediction based on the at least one reference image; and
  enhancement layer sampling and enhancement layer multiplexing the at least one compensated image into at least one frame-compatible image.

EEE87. The decoding method according to enumerated example embodiment 86, wherein the enhancement layer processing further comprises controlling the at least one enhancement layer reference picture buffer through memory management control operations (MMCOs).

EEE88. The decoding method according to enumerated example embodiment 87, wherein the enhancement layer processing further comprises receiving information regarding the MMCOs from a corresponding encoder.

EEE89. A decoding method for multi-layered frame-compatible video delivery, comprising:
  a) base layer processing a plurality of base layer bitstream signals through a base layer through a base layer, comprising:
    i) providing at least one frame-compatible base layer decode image or video frame; and
  b) enhancement layer processing a plurality of enhancement bitstream signals through one or more enhancement layers for multiple data categories through one or more enhancement layers, wherein each of the multiple data categories is processed separately in a separate enhancement layer, each of the one or more enhancement layers comprising:
    i) providing at least one enhancement layer-decoded image or video frame for one of the multiple data categories;
    ii) maintaining at least one enhancement layer reference picture buffer;
    iii) reference processing at least one dependency on the base layer or a different enhancement layer; and
    iv) performing disparity compensation, wherein all the multiple data categories are decoded and processed in the same enhancement layer.

EEE90. The decoding method according to enumerated example embodiment 89, wherein the multiple data categories comprise multiple views for stereoscopic images or videos.

EEE91. The decoding method according to enumerated example embodiment 89 or 90, wherein the base layer processing conforms to one of a plurality of existing video codecs.

EEE92. The decoding method according to enumerated example embodiment 91, wherein the plurality of existing video codecs comprise H.264/AVC, VP8, and VC-1.

EEE93. The decoding method according to any one of enumerated example embodiments 89-92, wherein the encoding layer processing adopts a hybrid video coding model, said hybrid video coding model conforming to any one of a plurality of existing codecs.

EEE94. The decoding method according to enumerated example embodiment 93, wherein the plurality of existing codecs comprise VC-1 and H.264/AVC.

EEE95. The decoding method according to any one of enumerated example embodiments 89-94, wherein the performing of motion or disparity compensation is based on at least one image stored in the enhancement layer reference picture buffer.

EEE96. The decoding method according to any one of enumerated example embodiments 89-95, wherein the enhancement layer processing further comprises:
  base layer to enhancement layer (BL-to-EL) processing at least one base layer decoded frame compatible image from a reference buffer in the base layer; and storing the BL-to-EL processed at least one base layer decoded frame compatible image in the at least one enhancement layer reference picture buffer.

EEE97. The decoding method according to enumerated example embodiment 96, wherein the BL-to-EL processing comprises reference processing, de-multiplexing and up-sampling the at least one base layer decoded frame compatible image.

EEE98. The decoding method according to enumerated example embodiment 97, wherein the BL-to-EL processing of each of the one or more enhancement layers is handled by a single processing unit that jointly performs and optimizes the reference processing, de-multiplexing and up-sampling of the at least one base layer decoded frame compatible image.

EEE99. The decoding method according to any one of enumerated example embodiments 89-98, wherein the enhancement layer processing further comprises:

enhancement layer to enhancement layer (EL-to-EL) processing at least one reference image stored in an enhance layer reference picture buffer in a different enhancement layer; and storing the EL-to-EL processed at least one enhancement layer reference image in the at least one enhancement layer reference picture buffer hereof.

EEE100. The decoding method according to any one of enumerated example embodiments 89-99, wherein the BL-to-EL processing further comprises resealing the BL-to-EL processed at least one base layer decoded frame compatible image to a target spatial resolution.

EEE101. The decoding method according to enumerated example embodiment 99 or 100, wherein the EL-to-EL processing further comprises resealing the EL-to-EL processed at least one enhancement layer reference image to a target spatial resolution.

EEE102. The decoding method according to enumerated example embodiment 89, wherein the providing of the at least one enhancement layer-decoded image or video frame for multiple data categories comprises:

adding reference images stored in the at least one enhancement layer reference picture buffer to at least one base layer to enhancement layer (BL-to-EL) prediction.

EEE103. The decoding method according to enumerated example embodiment 102, wherein the at least one BL-to-EL prediction is obtained by de-multiplexing and reference processing at least one frame-compatible decoded picture stored in a reference picture buffer of the base layer.

EEE104. The decoding method according to enumerated example embodiment 102, wherein the disparity compensation is performed for each of the multiple data categories.

EEE105. The decoding method according to enumerated example embodiment 89, wherein the providing of the at least one enhancement layer decoded images or video frames for one of the multiple data categories comprises adding reference images stored in the at least one enhancement layer reference picture buffer to at least one base layer to enhancement layer (BL-to-EL) prediction.

106. The decoding method according to enumerated example embodiment 105, wherein the at least one BL-to-EL prediction is obtained by de-multiplexing and reference processing at least one frame-compatible decoded picture stored in a reference picture buffer of the base layer.

EEE107. The decoding method according to enumerated example embodiment 106, wherein the de-multiplexing and reference processing further comprises filtering, interpolation, or resealing.

EEE108. An encoder for encoding at least one image or video frame according to the method recited in one or more of enumerated example embodiments 1-63, and 117.

EEE109. An apparatus for encoding at least one image or video frame according to the method recited in one or more of enumerated example embodiments 1-63, and 117.

EEE110. A system for encoding at least one image or video frame according to the method recited in one or more of enumerated example embodiments 1-63, and 117.

EEE111. A decoder for decoding at least one image or video frame according to the method recited in one or more of enumerated example embodiments 64-107, and 118.

EEE112. An apparatus for decoding at least one image or video frame according to the method recited in one or more of enumerated example embodiments 64-107, and 118.

EEE113. A system for decoding at least one image or video frame according to the method recited in one or more of enumerated example embodiments 64-107, and 118.

EEE114. A computer-readable medium containing a set of instructions that causes a computer to perform the method recited in one or more of enumerated example embodiments 1-107, 117, and 118.

EEE115. Use of the method recited in one or more of enumerated example embodiments 1-63, and 117 to encode at least one image or video frame.

EEE116. Use of the method recited in one or more of enumerated example embodiments 64-107, and 118 to decode at least one image or video frame.

EEE117. The encoding method according to any one of enumerated example embodiments 1-38, wherein the at least one enhancement layer reference picture buffer comprise at least two enhancement layer reference buffers.

EEE118. The decoding method according to any one of enumerated example embodiments 64-88, wherein the at least one enhancement layer reference picture buffer comprise at least two enhancement layer reference buffers.

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

The examples set forth above are provided to give those of ordinary skill in the art a complete disclosure and description of how to make and use the embodiments of the systems and methods for multi-layered frame-compatible video delivery of the disclosure, and are not intended to limit the scope of what the inventors regard as their disclosure. Modifications of the above-described modes for carrying out the disclosure may be used by persons of skill in the art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] D. C. Hutchison, "Introducing DLP 3-D TV", http://www.dlp.com/downloads/Introducing DLP 3D HDTV Whitepaper.pdf
[2] Advanced video coding for generic audiovisual services, http://www.itu.int/rec/recommendation.asp?type=folders&lang=e&parent=T-REC-H.264, March 2010.
[3] SMPTE 421M, "VC-1 Compressed Video Bitstream Format and Decoding Process", April 2006.
[4] A. Tourapis, P. Pahalawatta, A. Leontaris, K. Stec, and W. Husak, "Encoding and Decoding Architecture for Format Compatible 3D Video Delivery," U.S. Provisional Patent Application No. 61/223,027, July 2009.
[5] A. Leontaris, A. Tourapis, and P. Pahalawatta, "Enhancement Methods for Sampled and Multiplexed Image and Video Data," U.S. Provisional Patent Application No. 61/365,743, July 2010.
[6] A. Tourapis, A. Leontaris, P. Pahalawatta, and K. Stec, "Directed Interpolation/Post-processing methods for video encoded data," U.S. Provisional Patent Application No. 61/170,995, April 2009.
[7] P. Pahalawatta, A. Tourapis, W. Husak, "Systems and Methods for Multi-Layered Image and Video Delivery Using Reference Processing Signals", U.S. Provisional Patent Application No. 61/362,661, July 2010.

What is claimed is:

1. A decoding method for multi-layered frame-compatible video delivery, comprising:
   a) base layer processing a plurality of base layer bitstream signals through a base layer, comprising:
      i) providing at least one frame-compatible base layer decode image or video frame; and
   b) enhancement layer processing a plurality of enhancement bitstream signals through one or more enhancement layers, comprising:
      ii) providing at least one enhancement layer-decoded image or video frame for multiple views;
      iii) reference processing at least one frame-compatible base layer decode image or video frame from the base layer or at least one decoded image or video frame from a different enhancement layer; and
      iv) performing disparity compensation,
   wherein all the multiple views are decoded and processed in the same enhancement layer.

2. The method as recited in claim 1, wherein the multiple views comprise multiple views for stereoscopic images or videos.

3. The method as recited in claim 1, wherein the providing of the base layer frame-compatible representation of the images or video frames of the multiple views comprises:
   base layer sampling and base layer multiplexing the images or video frames of multiple views into a single frame.

4. The method as recited in claim 3, wherein the sampling of the base layer processing comprises symmetric or asymmetric filtering of the images or video frames of the multiple views.

5. The method as recited in claim 3, wherein the base layer sampling comprises horizontal sampling, vertical sampling, or quincunx sampling.

6. The method as recited in claim 3, wherein the base layer multiplexing uses any one frame-compatible packing arrangement of checkerboard interleaved arrangement, column interleaved arrangement, row interleaved arrangement, side by side arrangement, and over-under arrangement.

7. The method as recited in claim 2, wherein the base layer processing further comprises processing equal or unequal amount of samples of the images or video frames of the multiple views.

8. The method as recited in claim 1, wherein the enhancement layer processing further comprises:
   generating at least one reference image or video frame by predicting at least one predicted image from samples in the same image or frame or from samples from past decoded frames in the same enhancement layer, and
   storing the at least one reference image or video frame in the at least one enhancement layer reference picture buffer.

9. The method as recited in claim 8, wherein the generation of the at least one reference image or video frame further comprises de-multiplexing and reference processing the sum of at least one prediction residual image and the at least one predicted image.

10. The method as recited in claim 9, wherein the de-multiplexing further comprises upsampling and interpolating the sum of the at least one prediction residual image and the at least one predicted image.

11. The method as recited in claim 10, wherein one of the at least one enhancement layer reference picture buffer stores images or video frames at different resolutions from the rest of the at least one enhancement layer reference picture buffer.

12. The method as recited in claim 1, wherein the enhancement layer processing further comprises:
   selecting at least one reference image from the at least one enhancement layer reference picture buffer for each of the multiple views;
   enhancement layer sampling and enhancement layer multiplexing the selected at least one reference image into at least one frame-compatible image; and
   performing disparity compensation or inter prediction based on the at least one frame-compatible image.

13. The method as recited in claim 1, wherein the enhancement layer processing further comprises:
   base layer to enhancement layer (BL-to-EL) processing at least one base layer decoded frame compatible image from a reference buffer in the base layer; and
   storing the BL-to-EL processed at least one base layer decoded frame compatible image in the at least one enhancement layer reference picture buffer.

14. The method as recited in claim 13, wherein the BL-to-EL processing comprises one or more of:
   reference processing, de-multiplexing and up-sampling the at least one base layer decoded frame compatible image; or
   filtering, upscaling, and interpolating the at least one base layer decoded frame compatible image.

* * * * *